US012441022B2

(12) United States Patent
Sherman

(10) Patent No.: US 12,441,022 B2
(45) Date of Patent: Oct. 14, 2025

(54) TABLE SAW JIG AND METHOD OF USE

(71) Applicant: Woodpeckers, LLC, Strongsville, OH (US)

(72) Inventor: Wayne Sherman, Hinckley, OH (US)

(73) Assignee: Woodpeckers, LLC, Strongsville, OH (US)

( * ) Notice: Subject to any disclaimer, the term of this patent is extended or adjusted under 35 U.S.C. 154(b) by 253 days.

Patent file contains an affidavit/declaration under 37 CFR 1.130(b).

(21) Appl. No.: 17/882,777

(22) Filed: Aug. 8, 2022

(65) Prior Publication Data

US 2024/0042644 A1  Feb. 8, 2024

(51) Int. Cl.
*B27B 27/08* (2006.01)
*B27B 25/10* (2006.01)

(52) U.S. Cl.
CPC ............... *B27B 27/08* (2013.01); *B27B 25/10* (2013.01)

(58) Field of Classification Search
CPC ......... B27B 27/10; B27B 27/08; B27B 27/04; B27B 27/00; B27B 9/04; B27B 25/10; B27B 25/02; Y10T 83/743; Y10T 83/744; Y10T 83/745; Y10T 83/747; Y10T 83/741; Y10T 83/735; Y10T 83/727; Y10T 83/76;

(Continued)

(56) References Cited

U.S. PATENT DOCUMENTS 438,350 A    10/1890   Kingsbury
470,724 A   *   3/1892   Veach ..................... B27B 27/02
                                                                 83/448

(Continued)

FOREIGN PATENT DOCUMENTS

AU    2014261255 A1 * 1/2015 ............. B27B 27/02
EP        0180349 A2 * 5/1986

(Continued)

OTHER PUBLICATIONS

CDIYTOOL Woodworking Aluminum Alloy Circular Drawing Tool, Fixed-Point Marking Gauge Woodworking Compass Scribe, Metric/British, Adjustable Drawing Circle Ruler [online]. Oct. 23, 2021. [retrieved Jun. 11, 2024]. Retrieved from the Internet <URL: https: www.amazon.com>. (Year: 2021).*

(Continued)

*Primary Examiner* — Jennifer S Matthews
(74) *Attorney, Agent, or Firm* — Sand, Sebolt & Wernow Co., LPA

(57) ABSTRACT

A table saw jig for guiding offcut sides of various types of workpiece. The table saw jig includes a base that operably engages with a table of a table saw. The table saw jig also includes a slider that is moveably engaged inside of the base and is adapted to guide an offcut side of at least one workpiece along the table of the table saw. The table saw jig also includes at least one attachment assembly that operably engages with the base and is adapted to engage the base with the table of the table saw. The table saw jig also includes at least one calibration assembly that operably engages with the slider and the base. The at least one calibration assembly is configured to calibrate the slider relative to a blade of the table saw when the base is operably engaged with the table of the table saw.

17 Claims, 20 Drawing Sheets

(58) Field of Classification Search
CPC ...... B27C 5/06; B23D 59/001; B23D 59/002; B23D 47/045
USPC ................ 144/253.1, 253.3; 33/569, 783
See application file for complete search history.

(56) References Cited

U.S. PATENT DOCUMENTS

| | | | |
|---|---|---|---|
| 755,318 A | 3/1904 | Schofield | |
| 1,994,957 A * | 3/1935 | Miller | B27B 27/04 |
| | | | 144/253.1 |
| 2,722,247 A * | 11/1955 | Schroeder | B23Q 3/002 |
| | | | 144/250.15 |
| 2,783,793 A | 3/1957 | Prince et al. | |
| 2,888,708 A | 6/1959 | Seidner | |
| 2,970,203 A | 1/1961 | Sanner et al. | |
| 4,719,823 A | 1/1988 | Pyle | |
| D362,608 S | 9/1995 | Hewitt | |
| 6,752,059 B1 | 6/2004 | Posont | |
| D651,884 S | 1/2012 | Jansson | |
| D760,827 S | 7/2016 | May et al. | |
| D950,360 S | 5/2022 | Wu et al. | |
| D965,032 S | 9/2022 | Crow | |
| 2005/0241450 A1* | 11/2005 | Schwartz | B27B 29/00 |
| | | | 83/448 |
| 2006/0201297 A1* | 9/2006 | Friend | B27B 27/02 |
| | | | 83/436.1 |
| 2010/0307302 A1* | 12/2010 | Smith | B27B 25/10 |
| | | | 83/13 |
| 2012/0098183 A1* | 4/2012 | Sharp | B23Q 3/00 |
| | | | 269/315 |
| 2020/0263441 A1 | 8/2020 | Miller | |
| 2021/0170508 A1* | 6/2021 | Chang | B27B 27/02 |
| 2022/0063124 A1 | 3/2022 | Raczki | |
| 2022/0072670 A1 | 3/2022 | Earls | |
| 2022/0258372 A1 | 8/2022 | McGehee | |

FOREIGN PATENT DOCUMENTS

| | | | | |
|---|---|---|---|---|
| WO | WO-03103910 A1 * | 12/2003 | | B27B 27/08 |
| WO | 2010020006 A1 | 2/2010 | | |

OTHER PUBLICATIONS

Rockler Woodworking and Hardware, MagSwitch Dual Roller Fence (8110130), MagSwitch Dual Roller Guide Attachment, https://www.rockler.com/magswitch-dual-roller-guide-attachment, Copyright @ 2022 Rockler Companies, Inc., Strongsville, Ohio, USA.

Rockler Woodworking and Hardware, Magswitch® Ultimate Thin Stock Jig/Rip Guide Attachment, https://www.rockler.com/magswitch-ultimate-thin-stock-jig-rip-guide-attachment, Copyright @ 2022 Rockler Companies, Inc., Strongsville, Ohio, USA.

Infinity Cutting Tools, Thin-Rip Guide for Table Saw; Bandsaw & Router Table, https://www.infinitytools.com/thin-rip-guide-for-table-saw-bandsaw-router-table, Copyright @ 2020 Infinity Tools, Oldsmar, Florida, USA.

Magswitch Ultimate Thin Stock Jig Rip Guide—Tool Attachment for use with the Magswitch Workholding System; Magswitch; Amazon.com; Nov. 15, 2011; accessed Nov. 14, 2022; URL:<https://www.amazon.com/Magswitch-Ultimate-Thin-Stock-Guide/dp/B004IOAF6S > (Year: 2011).

Thin Rip Table Saw Jig; Fratzel; Wayback Machine of homeconstructionimprovement.com; Mar. 1, 2014; accessed Nov. 15, 2022; URL:<https://web.archive.org/web/20140301131008/http://www.homeconstructionimprovement.com/thin-rip-table-saw-jig > (Year: 2014).

DCT Woodworking Thin Rip Table Saw Jig Guide Tool for Router or Band Saw Cutting Wood/Ripping Chair Slates, Cabinet; Deadwood Crafted Tools; Amazon.com; Dec. 29, 2017; accessed Nov. 14, 2022; URL:<https://www.amazon.com/dp/B078PSYMB8/ > (Year: 2017).

Woodworking Table Saw Fast Cutting Limit Fence, Workbench T Track Adjustable Positioning Fixing Tool With Sliding Roller, Thin-Rip Tablesaw Jig Table Saw Router Cutting Wood Board Fixed Tool (1Pc); CDIYTOOL; Amazon.com; Jul. 15, 2022; accessed Nov. 14, 2022; URL:<https://www.amazon.com/dp/B0B6MVR4-YV/ > (Year: 2022).

* cited by examiner

TABLE SAW JIG AND METHOD OF USE

TECHNICAL FIELD

This disclosure is directed to a multipurpose tool for guiding an offcut side of a workpiece along a table saw.

BACKGROUND

Table saws are versatile tools used in multiple projects for making cuts into different types of workpiece, such as wood workpiece. Generally, table saws and similar machines of the like are used in woodworking projects for cutting and/or sawing into a workpiece at various dimensions and angles based on the orientation and/or arrangement of the workpiece used with a selected table saw. While a woodworker may use a table saw or a similar woodworking device to make cuts into a workpiece, it may become extremely difficult and demanding to make precise and accurate straight cuts into a workpiece that are substantially precise to the angle predetermined by the woodworker. Moreover, it may also become difficult and demanding to prevent a workpiece from being kicked back towards a woodworker at an offcut side of the workpiece when pushing the workpiece through a cutting blade of the table saw.

To address these difficulties and problems, a woodworker may select a desired, conventional guiding tool (e.g., a thin-ripping guide) to help stabilize and guide an offcut side of the workpiece through a cutting blade of a table saw during a woodworking project. While such tools are available in the today's current market, the woodworker may have to use a number of different devices with the conventional guiding tool to perform straight cut into a workpiece. For example, the woodworker may have to use a first set of assisting devices with the conventional guiding tool for making a first straight cut into a first workpiece and a second set of assisting devices with the same conventional guiding tool for making a second cut into a second workpiece. In another example, the woodworker may have to use a first measurement device with the conventional guiding tool for making a first straight cut into a first workpiece and a second measurement device with the same conventional guiding tool for making a second cut into a second workpiece. In yet another example, a woodworker may have to use different conventional guiding tools for different styles of table saws and machines of the like having different styles of miter slots. Such use of multiple assisting devices and/or measurement devices along with multiple conventional guiding tools requires the woodworker to have access to these various assisting devices and/or measurement devices and requires the expenditure of more time and effort when the woodworker is making straight cuts into a workpiece with a table saw or similar machines of the like.

SUMMARY

The presently disclosed table saw jig provides a woodworker with multifunctional use for guiding and maintaining various types of workpiece along an offcut side of such workpiece. The disclosed table saw jig includes at least one calibration assembly that enables a woodworker to precisely and accurately align the table saw jig to the desired cutting distance away from a cutting blade of the table saw. The disclosed table saw jig also includes a bearing assembly that reduces the overall number of table saw assisting devices that a woodworker would need to use to complete various cuts on various thicknesses of workpiece. The disclosed table saw also includes at least one pattern of openings that enables the woodworker to operably engage the table saw jig to various types of table saws thus eliminating and avoiding the use of switching between multiple conventional guiding tool. As such, the table saw jig disclosed herein addresses some of the inadequacies of previously known table saw jigs.

In one aspect, an exemplary embodiment of the present disclosure may provide a table saw jig. The table saw jig includes a base. The table saw jig also includes a slider that is moveably engaged inside of the base and adapted to guide an offcut side of at least one workpiece along a table of a table saw. The table saw jig also includes at least one attachment assembly that is operably engaged with the base and adapted to engage the base with the table of the table saw. The table saw jig also includes at least one calibration assembly that operably engaged with the slider and the base; wherein the at least one calibration assembly is configured to calibrate the slider relative to a blade of the table saw when the base is operably engaged with the table of the table saw.

This exemplary embodiment or another exemplary embodiment, table saw jig may further include that the at least one calibration assembly comprises: at least one indicator having at least one cursor and operably engaged with the slider; and at least one set of measurement markings provided on the base; wherein the at least one indicator is selectively moveable on the slider to substantially align the at least one cursor with at least one measurement marking of the at least one set of measurement markings to calibrate the table saw jig with the blade of the table saw. This exemplary embodiment or another exemplary embodiment, table saw jig may further include at least another calibration assembly operably engaged with the slider and the base; wherein the at least another calibration assembly further comprises: at least another indicator having at least another cursor and operably engaged with the slider; and at least another set of measurement markings provided on the base differing from the at least one set of measurement markings; wherein the at least another indicator is selectively moveable on the slider to substantially align the at least another cursor with at least one measurement marking of the at least another set of measurement markings to calibrate the table saw jig with the blade of the table saw. This exemplary embodiment or another exemplary embodiment, table saw jig may further include that the at least one indicator and the at least another indicator are separate and independent from one another. This exemplary embodiment or another exemplary embodiment, table saw jig may further include that the slider comprises: a bearing assembly operably engaged with the slider at a position remote from the base; wherein the bearing assembly is adapted to guide the offcut side of the at least one workpiece along the table of the table saw. This exemplary embodiment or another exemplary embodiment, table saw jig may further include that the bearing assembly comprises: a shaft operably engaged with the slider and having a top end and a bottom end vertically opposite to the top end; an upper bearing operably engaged at the top end of the shaft; and a lower bearing operably engaged at the bottom end of the shaft; wherein the lower bearing is configured to guide the offcut side of the at least one workpiece defining a first thickness along the table of the table saw; and wherein the upper bearing and the lower bearing are collectively configured to guide at least another offcut side of at least another workpiece defining a second thickness that is greater than the first thickness along the table of the table saw. This exemplary embodiment or another exemplary embodiment, table saw jig may further include that the slider further comprises: a first recess defined in the slider extending downwardly from a top surface of the slider towards a dividing wall of the slider; and a second recess defined in the slider extending upwardly from a bottom surface of the slider towards the dividing wall of the slider; wherein the first recess and the dividing wall are configured to receive and house the upper bearing partially inside of the slider; wherein the second recess and the dividing wall are configured to receive and house the lower bearing partially inside of the slider. This exemplary embodiment or another exemplary embodiment, table saw jig may further include that the base comprises: at least one pattern of openings extending entirely through the base between a top surface of the base and a bottom surface of the base; wherein the at least one pattern of openings is configured to receive the at least one attachment assembly for operably engaging the at least one attachment assembly with the base. This exemplary embodiment or another exemplary embodiment, table saw jig may further include that the at least one pattern of openings comprises: a first pattern of openings extending entirely through the base between the top surface of the base and the bottom surface of the base and located at a first distance from an end of the base; and a second pattern of openings extending entirely through the base between the top surface of the base and the bottom surface of the base and located at a second distance from the end of the base; wherein the second distance is greater than the first distance. This exemplary embodiment or another exemplary embodiment, table saw jig may further include that the first pattern of openings enables the at least one attachment assembly to engage with the table saw defining a first slot configuration; and wherein the second pattern of openings enables the at least one attachment assembly to engage with the table saw defining a second slot configuration different than the first slot configuration. This exemplary embodiment or another exemplary embodiment, table saw jig may further include that the base further comprises: a first end; a second end longitudinally opposite to the first end; and a cavity extending from the first end towards the second end; wherein the cavity is configured to receive a portion of the slider such that the first end of the slider is disposed exterior to the cavity and the second end of the slider is disposed interior to the cavity. This exemplary embodiment or another exemplary embodiment, table saw jig may further include an extension extending upwardly from the base inside of the cavity; and a channel extending upwardly into the slider from a bottom surface of the slider towards a top surface of the slider and is positioned vertically above the rail; wherein the engagement between the extension and the channel centrally aligns the slider with the base. This exemplary embodiment or another exemplary embodiment, table saw jig may further include a locking knob operably engaged with the base and the slider to enable linear movement of the slider relative to the base to move the slider inwardly and outwardly of the cavity. This exemplary embodiment or another exemplary embodiment, table saw jig may further include that when the locking knob is engaged with the base and disengaged with the slider, the slider is freely moveable inside of the cavity; and wherein when the locking knob is engaged with the base and engaged with the slider, the slider is freely moveable inside of the base.

In another aspect, and exemplary embodiment of the present disclosure may provide a method of guiding at least one offcut side of at least one workpiece. The method comprises steps of: engaging a table saw jig, via at least one attachment assembly of the table saw jig, with at least one miter slot defined in a table of a table saw; moving a slider of the table saw jig away from a base of the table saw jig and towards a cutting blade of the table saw until the slider directly abuts the cutting blade; calibrating the slider, via at least one calibration assembly of the table saw jig, relative to the cutting blade of the table saw; setting the slider to a desired guide position, via the at least one calibration assembly, relative to the base; engaging the table saw jig with the table of the table saw, via the at least one attachment assembly, at a distance away from the cutting blade; and guiding the at least one offcut side of the at least one workpiece.

This exemplary embodiment or another exemplary embodiment, table saw jig may further include a step of calibrating at least one indicator of the at least one calibration assembly with at least one whole measurement marking of at least one set of measurement markings of the at least one calibration assembly. This exemplary embodiment or another exemplary embodiment, table saw jig may further include a step of engaging a lower bearing of a bearing assembly of the table saw jig with the at least one offcut side of the at least one workpiece defining a first thickness. This exemplary embodiment or another exemplary embodiment, table saw jig may further include a step of engaging the lower bearing of the bearing assembly and an upper bearing of the bearing assembly with at least another offcut side of at least another workpiece defining a second thickness greater than the first thickness. This exemplary embodiment or another exemplary embodiment, table saw jig may further include a steps of engaging the at least one attachment assembly with the base via a first opening from a first pattern of openings defined in the base; engaging at least another attachment assembly with the base via a second opening from the first pattern of openings defined in the base; and engaging the base with the table of the table saw, via one or both of the at least one attachment assembly and the at least another attachment assembly, when the table defines a first slot configuration. This exemplary embodiment or another exemplary embodiment, table saw jig may further include steps of engaging the at least one attachment assembly with the base via a first opening from a second pattern of openings defined in the base; engaging the at least another attachment assembly with the base via a second opening from the second pattern of openings defined in the base; and engaging the base with the table of the table saw, via one or both of the at least one attachment assembly and the at least another attachment assembly, when the table defines a second slot configuration different than the first slot configuration.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

FIGS. 1-11 illustrate a thin ripping jig or table saw jig generally referred to as 1. As illustrated in FIGS. 12-21, the table saw jig 1 is operably engaged with a table saw via at least one miter slot defined in a table top of the table saw for guiding a workpiece along the table saw when engaging an offcut side of the workpiece; such operation of guiding an offcut side of a workpiece along the table saw is described in more detail below. In other exemplary embodiments, a table saw jig described and illustrated herein may be operably engaged with any suitable device of the like for guiding an offcut side of a workpiece during a woodworking project. In one exemplary embodiment, a table saw jig described and illustrated herein may be operably engaged with a bandsaw table for guiding a workpiece along the bandsaw table when engaging an offcut side of the workpiece. In one exemplary embodiment, a table saw jig described and illustrated herein may be operably engaged with a router table for guiding a workpiece along the router table when engaging an offcut side of the workpiece.

Figure 1:
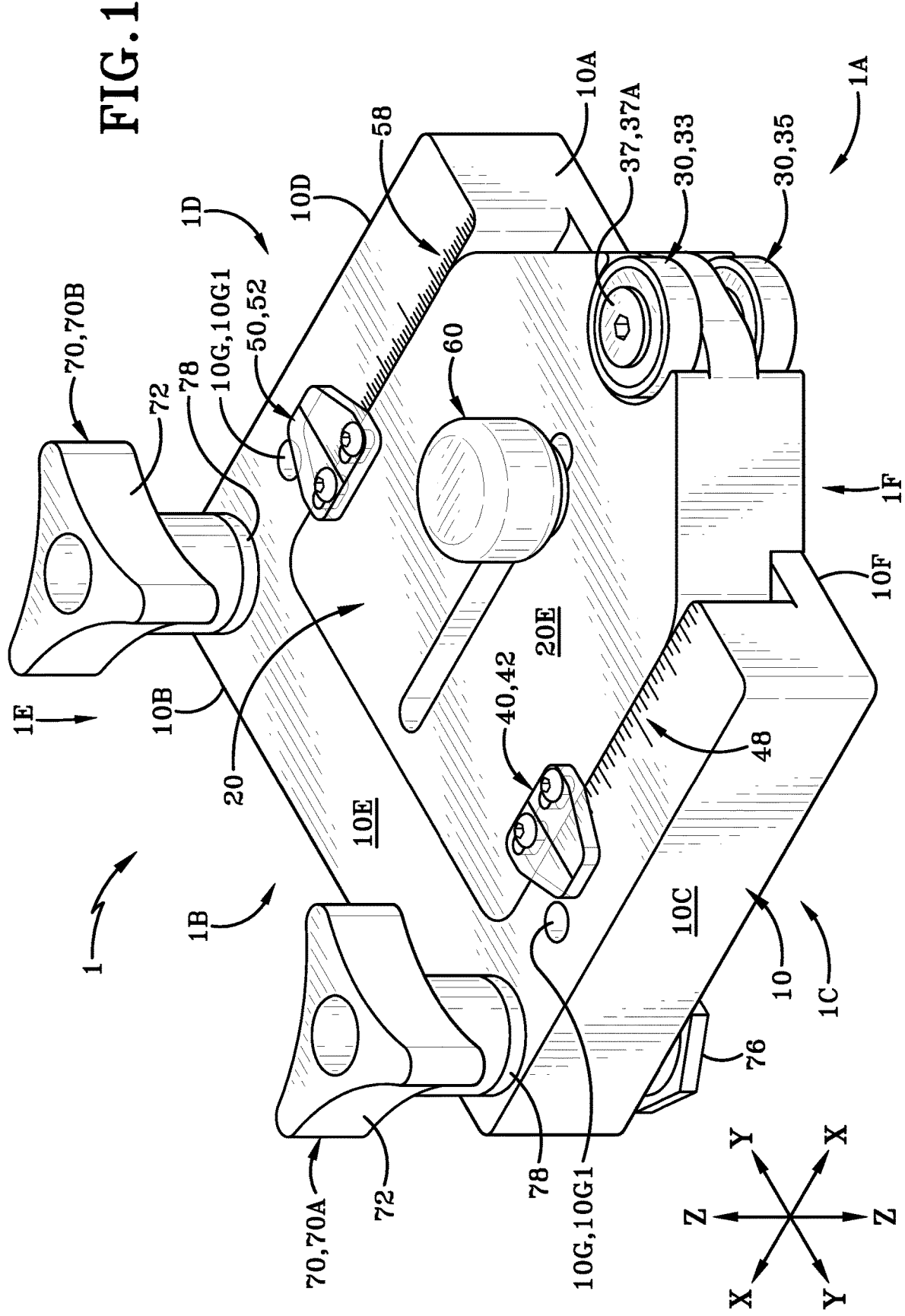
FIG. 1 (FIG. 1) is a top, front, first side isometric perspective view of a table saw jig in accordance with a particular embodiment.

As illustrated in FIG. 1, the table saw jig 1 includes a first or front end 1A, a second or rear end 1B opposite to the first end 1A, and a longitudinal axis "X" defined therebetween (see FIG. 1). The table saw jig 1 also includes a first or right side 1C defined between the first end 1A and the second end 1B, a second or left side 1D defined between the first end 1A and the second end 1B and opposite to the first side 1C, and a transverse axis "Y" defined therebetween (see FIG. 1). The table saw jig 1 also includes a third or top end 1E defined vertically above the first end 1A, the second end 1B, the first side 1C, and the second side 1D, a fourth or bottom end 1F defined vertically below the first end 1A, the second end 1B, the first side 1C, and the second side 1D, and a vertical axis "Z" defined therebetween (see FIG. 1). It should be understood that terms "front", "rear", "left", "right", "top", "bottom", and other derivative terms of the like describing direction or position should not limit the configuration and/or orientation of the table saw jig 1 when used in operation. The component and parts that form the table saw jig 1 are described in more detail below.

Figure 3:
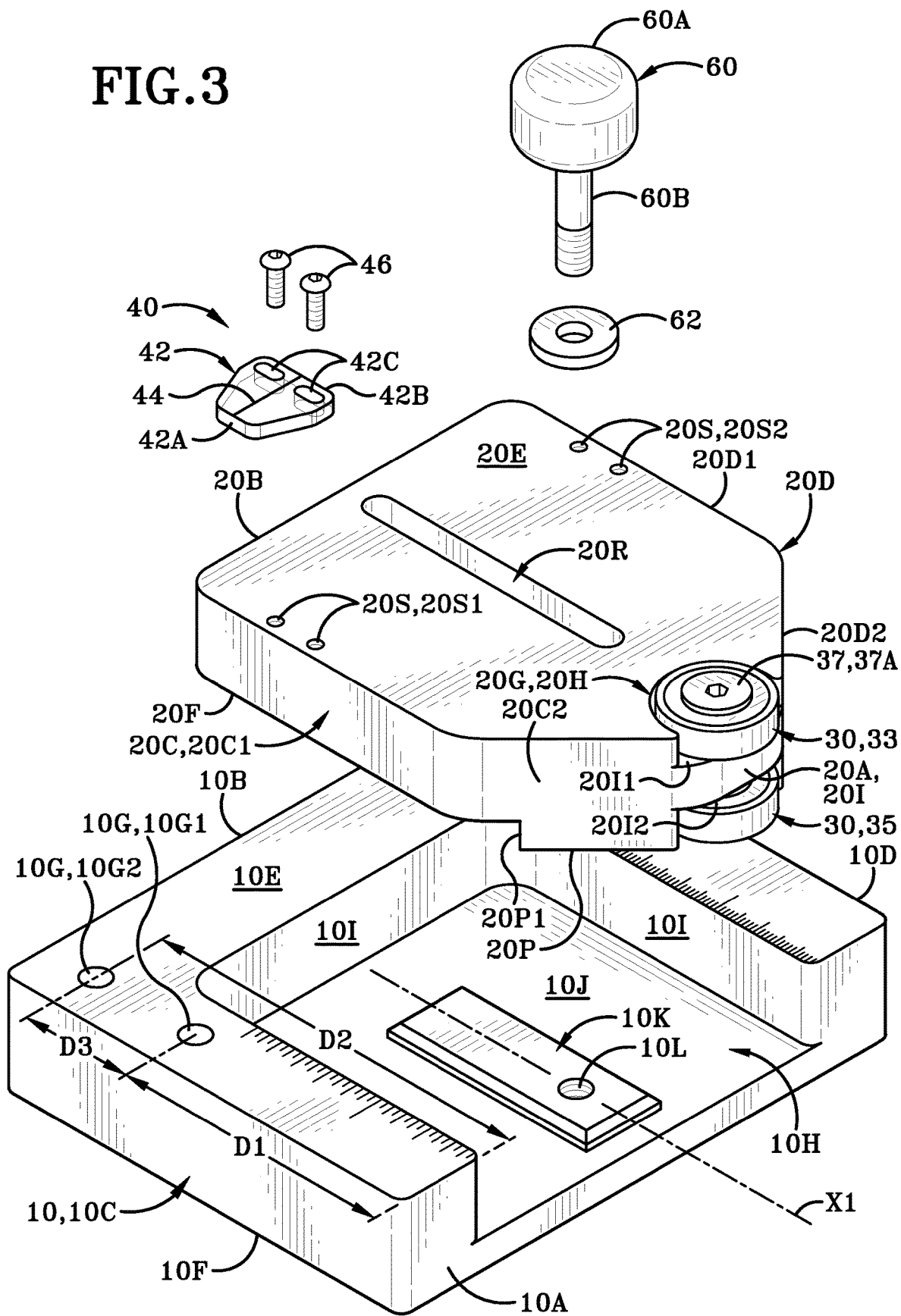
FIG. 3 (FIG. 3) is another partial exploded view of a base, a slider, at least one calibration assembly, and a locking knob of the table saw jig.

Referring to FIG. 3, the table saw jig 1 includes a base 10 that operably engages with a table top of a table saw during woodworking projects. The base 10 includes a first end 10A, a second end 10B opposite to the first end 10A, and a longitudinal axis "X1" defined therebetween. The base 10 also includes a first side 10C defined between the first end 10A and the second end 10B, a second side 10D defined between the first end 10A and the second end 10B and opposite to the first side 10C, and a transverse axis defined therebetween. The base 10 also includes a top end 10E defined vertically above the first end 10A, the second end 10B, the first side 10C, and the second side 10D, a bottom end 10F defined vertically below the first end 10A, the second end 10B, the first side 10C, and the second side 10D and opposite to the top end 10E, and a vertical axis defined therebetween.

Referring to FIG. 3, the base 10 defines at least one pattern of openings 10G that extends entirely through the base 10 from the top end 10E to the bottom end 10F. In the illustrated embodiment, the base 10 defines a first pattern of openings 10G1 that extends entirely through the base 10 from the top end 10E to the bottom end 10F. The top end 10E and the bottom end 10F of the base 10 are also in fluid communication with one another at each opening of the first pattern of openings 10G1. The first pattern of openings 10G1 is also defined between the first end 10A and the second end 10B proximate to the second end 10B of the base 10. More particularly, a first opening of the first pattern of openings 10G1 is defined proximate to the first side 10C of the base 10, and a second opening of the first pattern of openings 10G1 is defined proximate to the second side 10D of the base 10 transverse opposite to the first opening. Each opening of the first pattern of openings 10G1 is also defined a first distance away from the first end 10A of the base 10; the first distance is denoted by a double arrow labeled "D1" in FIG. 3 and is approximately about two and one-half inches away from the first end 10A. Such use and purpose of the first pattern of openings 10G1 is described in more detail below.

Still referring to FIG. 3, the base 10 defines a second pattern of openings 10G2 that extends entirely through the base 10 from the top end 10E to the bottom end 10F. The top end 10E and the bottom end 10F of the base 10 are also in fluid communication with one another at each opening of the second pattern of openings 10G2. The second pattern of openings 10G2 is also defined between the first pattern of openings 10G1 and the second end 10B proximate to the second end 10B of the base 10. More particularly, a first opening of the second pattern of openings 10G2 is defined proximate to the first side 10C of the base 10, and a second opening of the second pattern of openings 10G2 is defined proximate to the second side 10D of the base 10 transverse opposite to the first opening. Each opening of the second pattern of openings 10G2 is also defined a second distance away from the first end 10A of the base 10; the second distance is denoted by a double arrow labeled "D2" in FIG. 3 and is approximately about three and one-half inches away from the first end 10A. In the illustrated embodiment, the second distance "D2" of the second pattern of openings 10G2 is greater than the first distance "D1" of the first pattern of openings 10G1 relative to the first end 10A of the base 10. Additionally, a third distance is defined between an opening from the first pattern of openings 10G1 and an opening from the second pattern of openings 10G2; the third distance is denoted by a double arrow labeled "D3" in FIG. 3. In the illustrated embodiment, the third distance "D3" is less than the first distance "D1" and the second distance "D2" and is approximately about one inch between an opening from the first pattern of openings 10G1 and an opening from the second pattern of openings 10G2. Such use and purpose of the second pattern of openings 10G2 is described in more detail below.

Referring to FIG. 3, the base 10 also defines a cavity 10H. The cavity 10H extends vertically downward into the base 10 from the top end 10E towards the bottom end 10F. The cavity 10H is bound by an interior wall 10I that is generally U-shaped and extends vertically downward from the top end 10E to a base wall 10J of the base 10. The cavity 10H is accessible at one or both of the first end 10A and the top end 10E; in other words, the cavity 10H is in fluid communication with the external environment surrounding the base 10 at one or both of the first end 10A and the top end 10E. Such use and purpose of the cavity 10H is described in further detail below.

Referring to FIG. 3, the base 10 also includes at least one extension or rail 10K that extends vertically upward from the base wall 10J and into the cavity 10H. In the illustrated embodiment, the base 10 includes a single extension 10K that extends vertically upward from the base wall 10J and into the cavity 10H. The extension 10K of the base 10 is also positioned intermediate on the base wall 10J inside of the cavity 10H. The extension 10K is also oriented along an axis that is parallel with the longitudinal axis "X1" of the base 10. In other exemplary embodiment embodiments, any suitable number of extensions may be provided with a base, and any extension may be positioned at any location on the base inside a cavity defined by the base. Such use and purpose of the extension 10K is described in more detail below.

Figure 10:
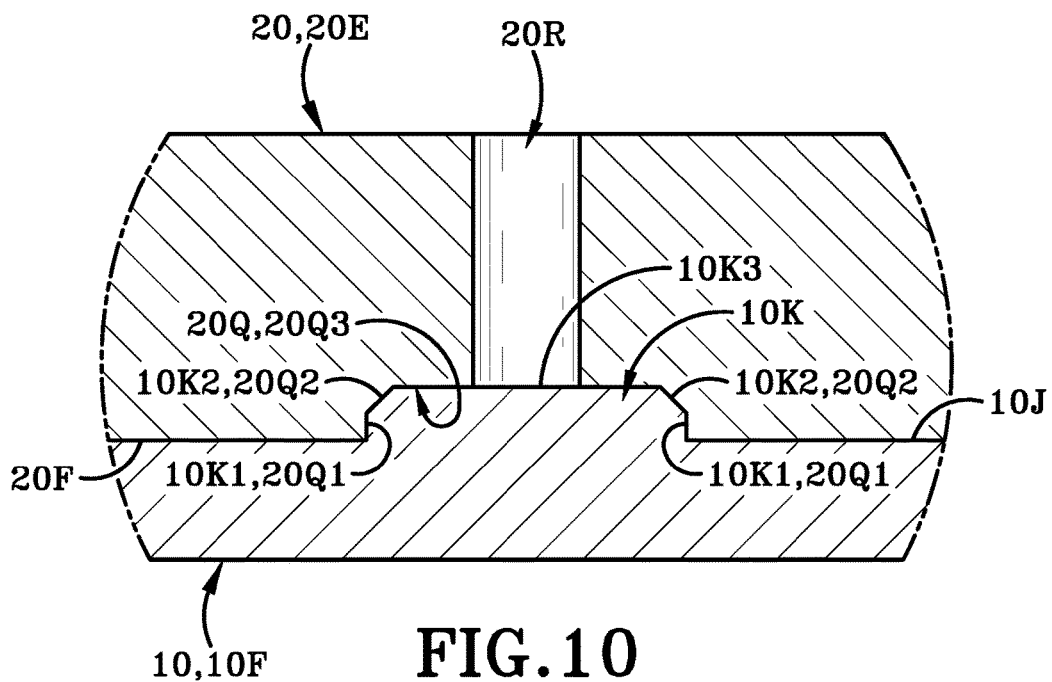
FIG. 10 (FIG. 10) is an enlargement of the highlighted region in FIG. 9.
Figure 11:
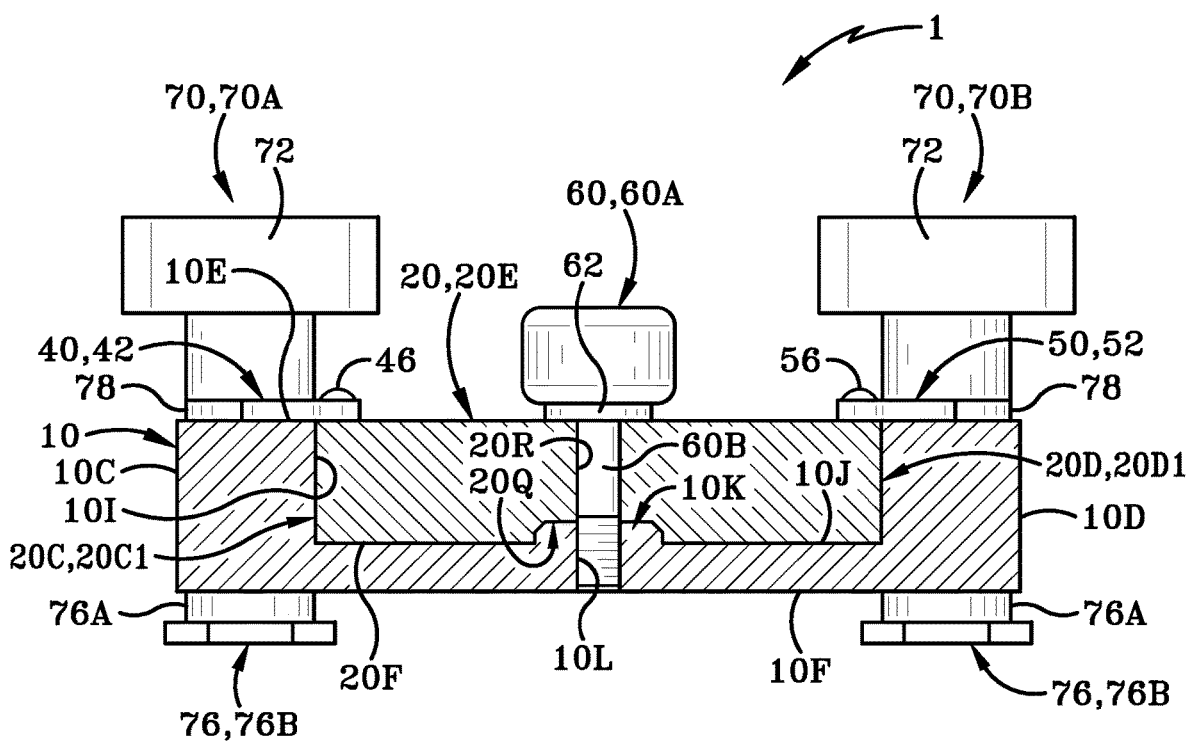
FIG. 11 (FIG. 11) is a transverse sectional view of the table saw jig taken in the direction of lines 11-11 shown in FIG. 7.
Figure 12:
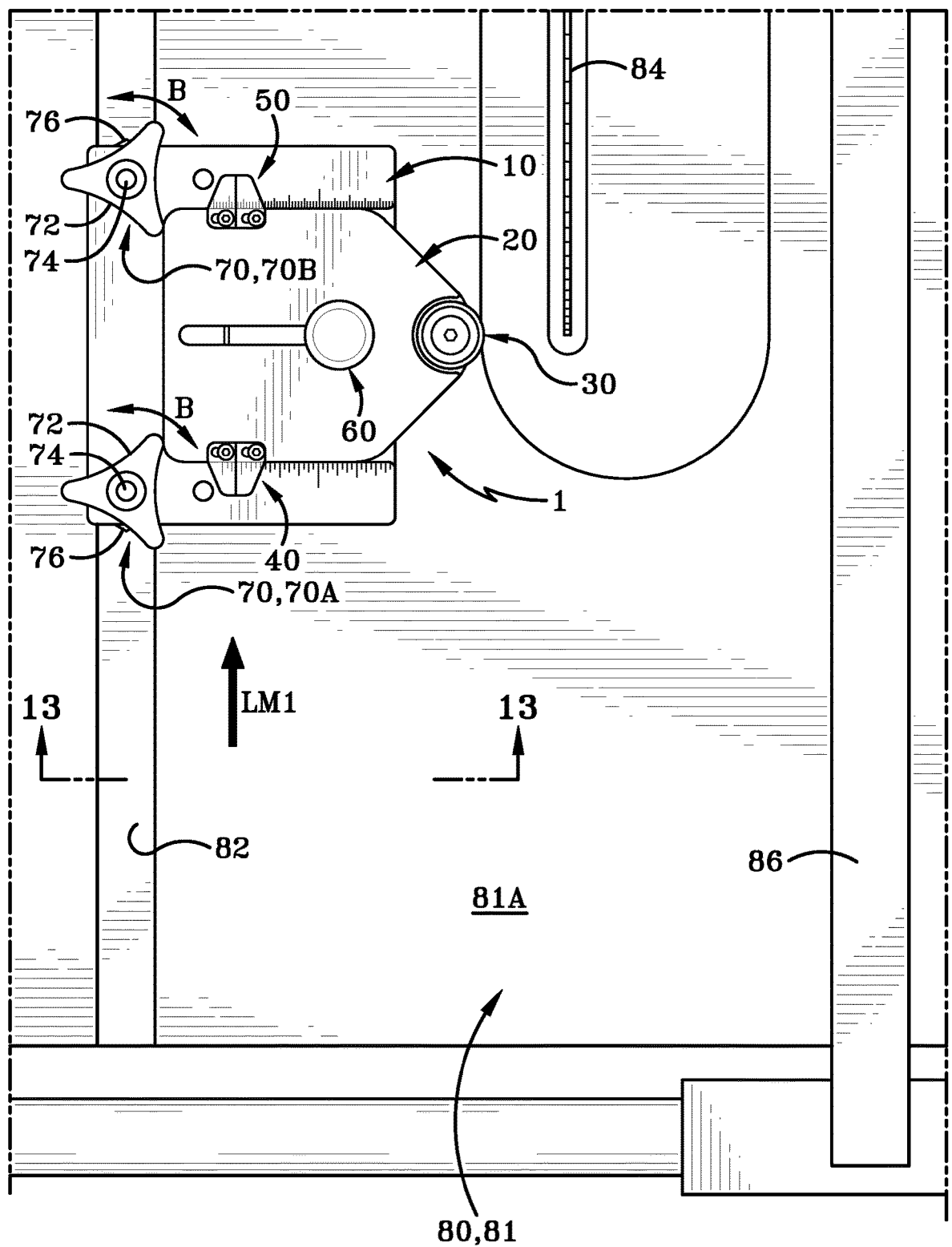
FIG. 12 (FIG. 12) is an operational view of the table saw jig operably engaging with a table saw.

The extension 10K is defined by a pair of lower walls 10K1, a pair of intermediate walls 10K2 angled inwardly of the pair of lower walls 10K1, and an upper wall 10K3. As best illustrated in FIG. 10, the pair of lower walls 10K1 extends upwardly from the base wall 10J to the pair of intermediate walls 10K2 where each lower wall of the pair of lower walls 10K1 is spaced apart from one another and parallel with one another. Still referring to FIG. 10, the pair of intermediate walls 10K2 extends upwardly from the pair of lower walls 10K1 to the upper walls 10K3 where each intermediate wall of the pair of intermediate walls 10K2 is spaced apart from one another and is positioned at an angle relative to the pair of lower walls 10K1. In the illustrated embodiment, each intermediate wall of the pair of intermediate walls 10K2 is positioned at an acute angle relative to the pair of lower walls 10K1. Still referring to FIG. 10, the upper wall 10K3 extends between the pair of intermediate walls 10K2 and is positioned perpendicular with the pair of lower walls 10K1.

Still referring to FIG. 3, the base 10 also defines at least one threaded opening 10L inside of the extension 10K. In the illustrated embodiment, the base 10 defines a single threaded opening 10L inside of the extension 10K. The threaded opening 10L extends vertically downward from the extension 10K to the bottom end 10F of the base 10; as such, the cavity 10H and the bottom end 10F of the base 10 are in fluid communication with one another via the threaded opening 10L. The threaded opening 10L is also intermediate the first end 10A and the second end 10B proximate to the first end 10A.

Referring to FIGS. 2-11 the table saw jig 1 also includes a slider 20 that operably engages with the base 10. The slider 20 is also selectively adjustable with the base 10 in which the slider 20 is linearly moveable inwardly and outwardly of the base 10 relative to the longitudinal axis "X1" of the base 10, which is described in more detail below. The features and characteristics of the slider 20 are described in greater detail below.

Figure 4:
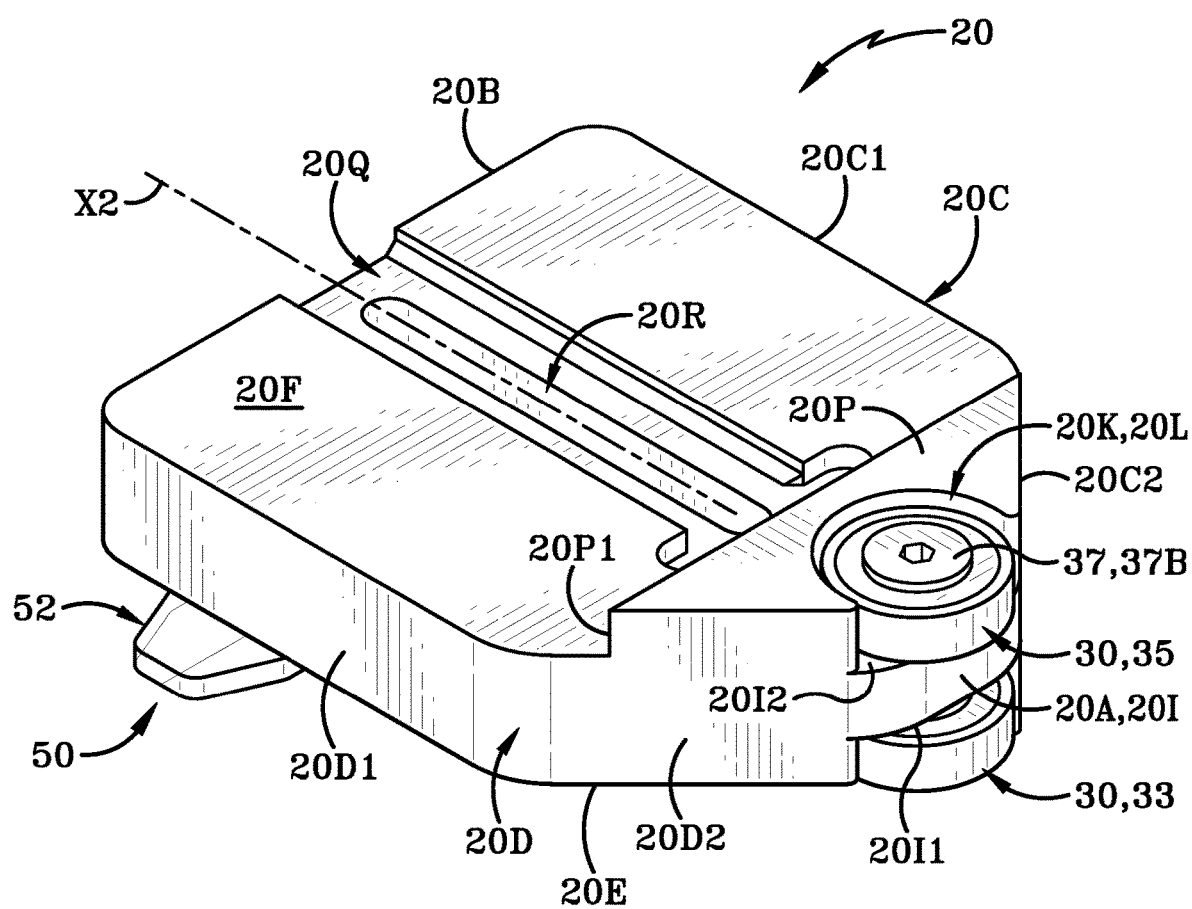
FIG. 4 (FIG. 4) is a bottom, front, second side isometric perspective view of the slider and the at least one calibration assembly shown in FIG. 3 of the table saw jig.

Referring to FIG. 3, the slider 20 includes a first end 20A, a second end 20B opposite to the first end 20A, and a longitudinal axis "X2" defined therebetween (see FIG. 4). The slider 20 also includes a first side 20C defined between the first end 20A and the second end 20B, a second side 20D defined between the first end 20A and the second end 20B and opposite to the first side 20C, and a transverse axis defined therebetween. The slider 20 also includes a top end 20E defined vertically above the first end 20A, the second end 20B, the first side 20C, and the second side 20D, a bottom end 20F defined vertically below the first end 20A, the second end 20B, the first side 20C, and the second side 20D and opposite to the top end 20E, and a vertical axis defined therebetween.

Figure 7:
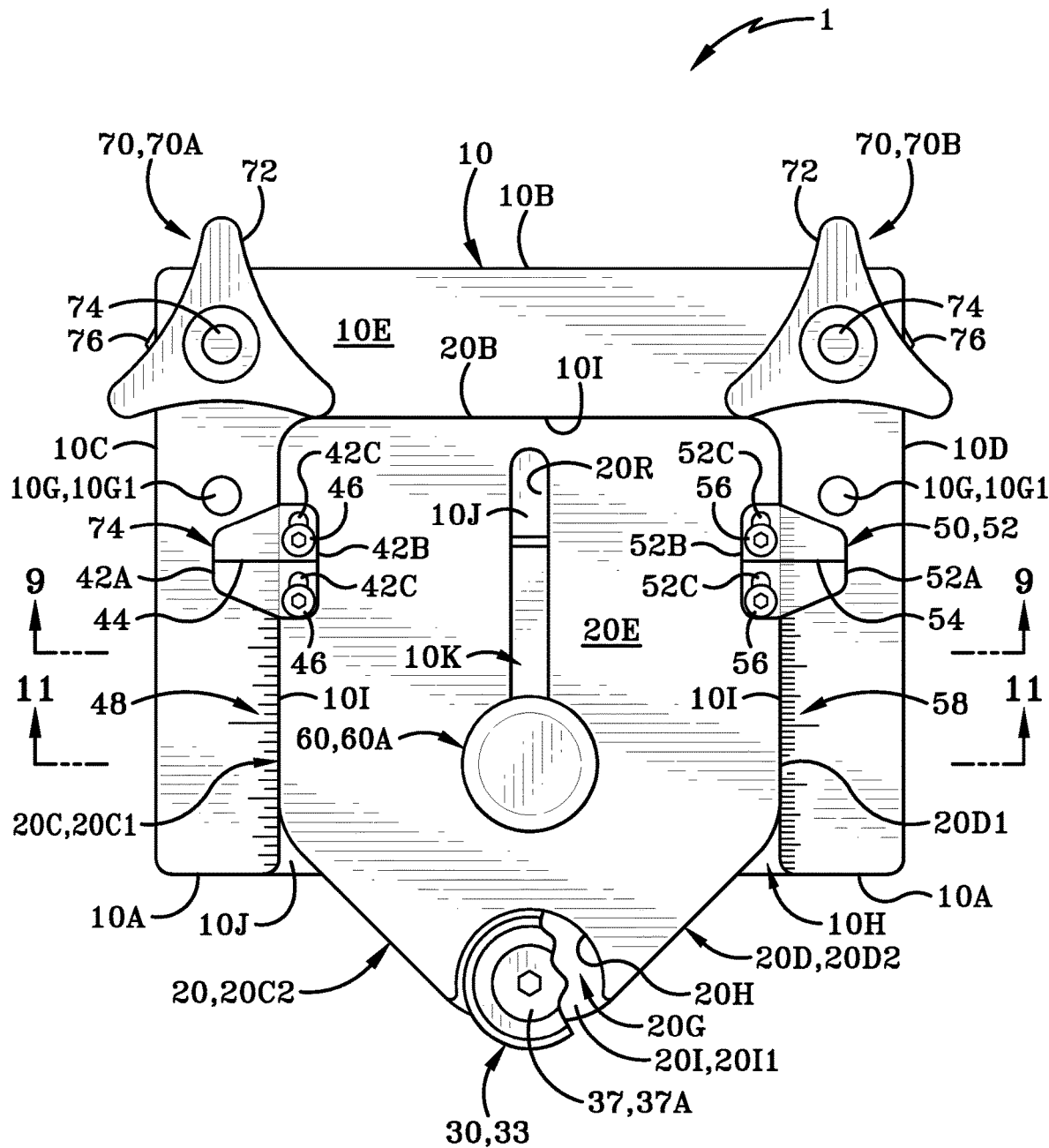
FIG. 7 (FIG. 7) is a top plan view of the table saw jig shown in FIG. 1.

Referring to FIGS. 3 and 7, the slider 20 defines at least one recess that extends into the slider 20 proximate to the first end 20A. In the illustrated embodiment, the slider 20 defines a first recess 20G that extends vertically downward from the top end 20E towards the bottom end 20F. The first recess 20G is bounded by a first inner arcuate wall 20H that extends vertically downward from the top end 20E to a dividing wall 20I. The first recess 20G is accessible at the top end 20E of the slider 20. Such use and purpose of the first recess 20G along with the dividing wall 20I is described in more detail below.

Figure 8:
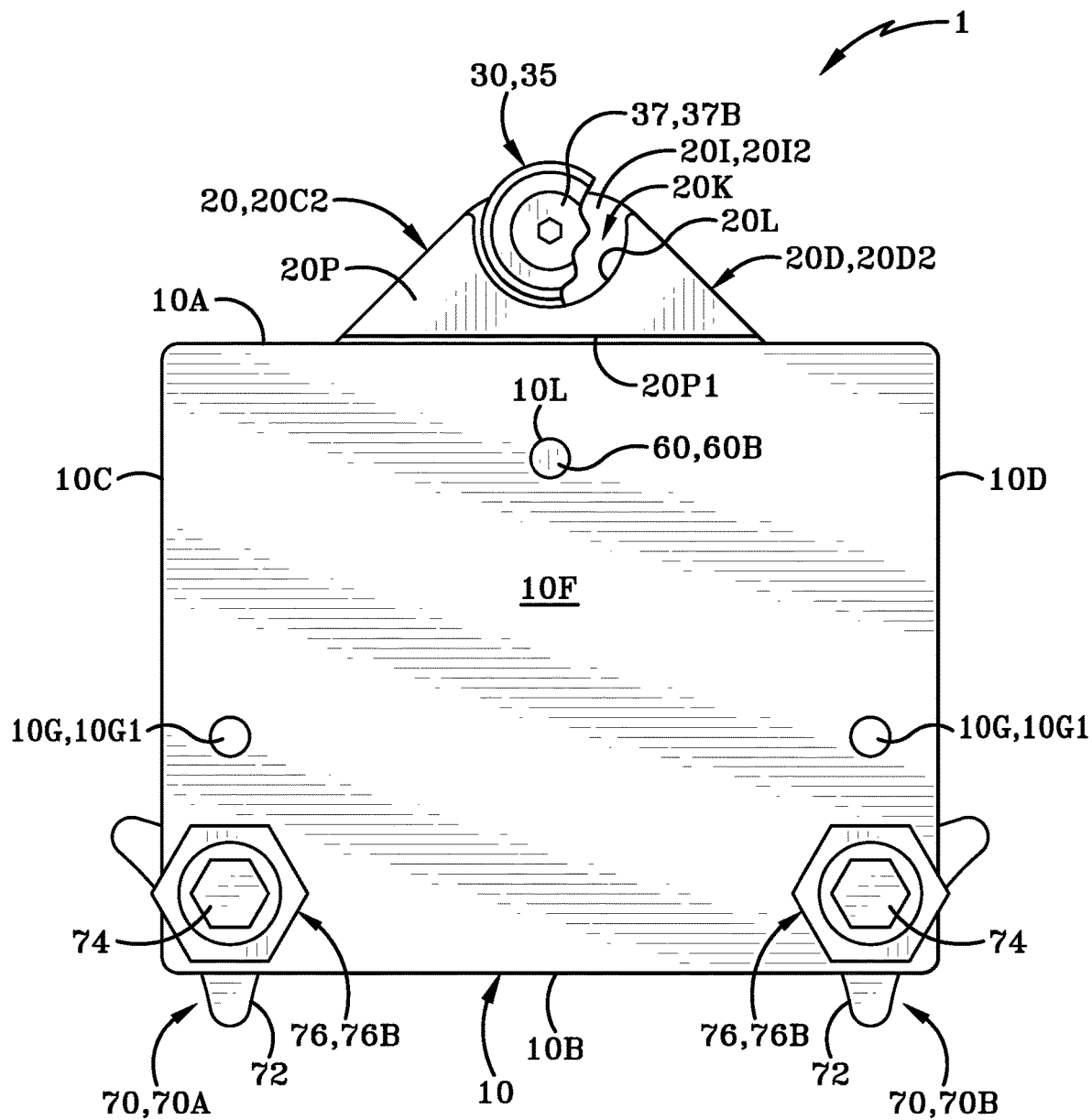
FIG. 8 (FIG. 8) is a bottom plan view of the table saw jig shown in FIG. 1.

Still referring to FIGS. 3 and 8, the slider 20 also defines a second recess 20K that extends vertically upward from the bottom end 20F towards the top end 20E. The second recess 20K is bounded by a second inner arcuate wall 20L that extends vertically upward from the bottom end 20F to the dividing wall 20I. The second recess 20K is accessible at the bottom end 20F of the slider 20. Such use and purpose of the second recess 20K along with the dividing wall 20I is described in more detail below.

Figure 5:
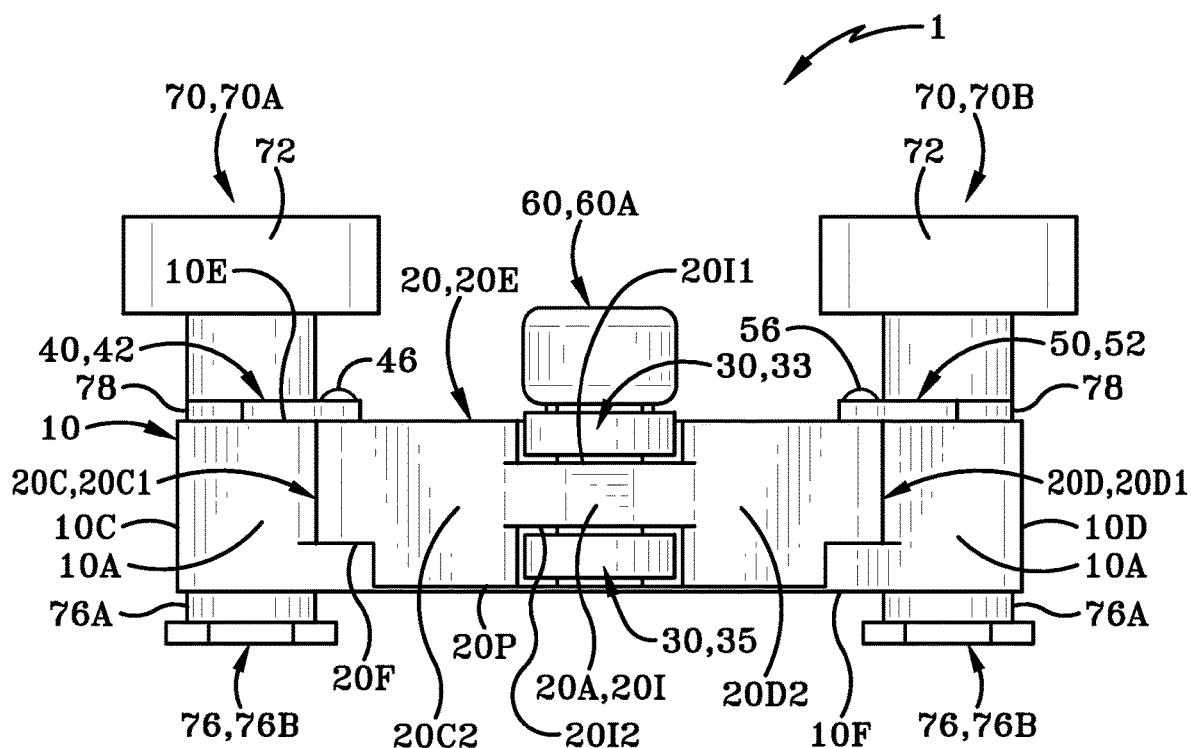
FIG. 5 (FIG. 5) is front elevation view of the table saw jig shown in FIG. 1.

Still referring to FIG. 5, the slider 20 also may defines a passageway defined proximate to the first end 20A of the slider 20. More particularly, the dividing wall 20I of the slider 20 defines the passageway that extends entirely through the dividing wall 20I between an upper surface 20I1 of the dividing wall 20I and a lower surface 20I2 of the dividing wall 20I; as such, the upper surface 20I1 and the lower surface 20I2 are in fluid communication with one another via the passageway. In regards to the dividing wall 20I, the upper surface 20I1 is defined inside of the first recess 20G, and the lower surface 20I2 is defined inside of the second recess 20K. With such locations of the upper surface 20I1 and the lower surface 20I2, the first recess 20G and the second recess 20K are also in fluid communication with one another via the passageway defined in the dividing wall 20I.

Referring to FIG. 4, the slider 20 also includes an extension 20P. The extension 20P extends vertically downward from the bottom end 20F of the slider 20 and away from the slider 20. The extension 20P may also define a portion of the second recess 20K and the second aperture 20M along with a portion of the second inner arcuate wall 20L. The extension 20P also defines a rear surface 20P1 that is positioned remote from the dividing wall 20I and away from the first end 20A. The rear surface 20P1 of the extension 20P also faces in a direction towards the second end 20B of the slider 20. Such extension 20P is formed to house and engage a bearing assembly the table saw jig 1, which is described in more detail below.

Figure 9:
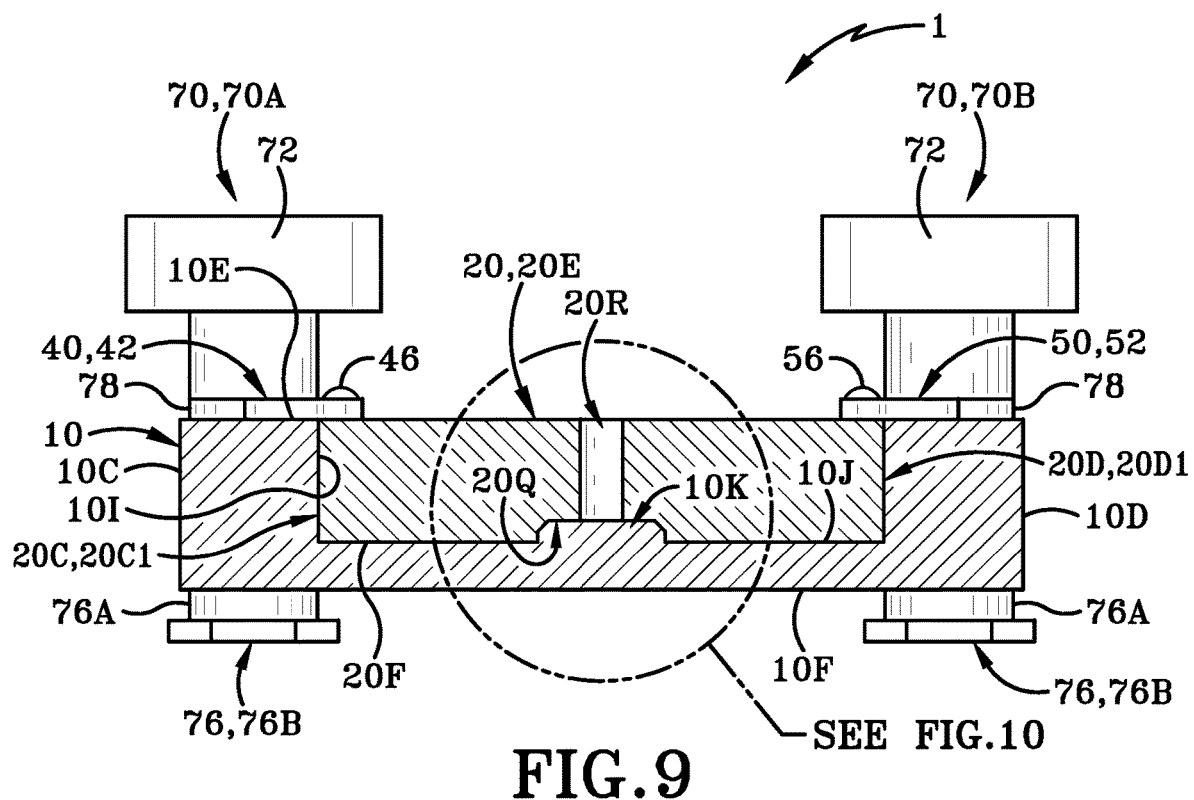
FIG. 9 (FIG. 9) is a transverse sectional view of the table saw jig taken in the direction of lines 9-9 shown in FIG. 7.

Referring to FIG. 4, the slider 20 also defines a channel 20Q that extends downwardly into the slider 20 from the bottom end 20F towards the top end 20E. As illustrated in FIGS. 9 and 10, the channel 20O is sized and configured to receive the extension 10K of the base 10 to enable the base 10 and the slider 20 to operably engage with one another. As such, the slider 20 linearly moves along the extension 10K of the base 10 when the slider 20 transitions between a collapsed position and an extended position. Such engagement between the base 10 and the slider 20, via the extension 10K and the channel 20Q, also provides a keyed mechanism to self-center the slider 20 with the base 10 when the slider 20 is traveling inwardly and outwardly of the base 10. With such mechanism, the slider 20 is maintained at a substantially centered orientation with the base 10 in which the longitudinal axis "X2" of the slider 20 is substantially aligned with the longitudinal axis "X1" of the base 10.

As best seen in FIG. 10, the channel 20O is collectively defined by a pair of bottom walls 20Q1, a pair of middle walls 20Q2, and a top wall 20Q3 that operably engage with the pair of lower walls 10K1, the pair of intermediate walls 10K2, and the upper wall 10K3 of the extension 10K. The pair of bottom walls 20Q1 extends upwardly into the slider 20 from the bottom end 20F to the pair of middle walls 20Q2 where each bottom wall of the pair of bottom walls 20Q1 is spaced apart from one another and parallel with one another. The pair of middle walls 20Q2 extends upwardly from the pair of bottom walls 20Q1 to the top wall 20Q3 where each middle wall of the pair of middle walls 20Q2 is spaced apart and is positioned at an angle relative to the pair of bottom walls 20Q1. In the illustrated embodiment, each middle wall of the pair of middle walls 20Q2 is positioned at an acute angle relative to the pair of bottom walls 20Q1. The top wall 20Q3 extends transversely between the pair of middle walls 20Q2 and is positioned perpendicular with the pair of bottom walls 20Q1. Upon assembly of the table saw jig 1, the pair of bottom walls 20Q1 operably engages with the pair of lower walls 10K1, the pair of middle walls 20Q2 operably engages with the pair of intermediate walls 10K2, and the top wall 20Q3 operably engages with the upper wall 10K3 to enable the keyed mechanism between the base 10 and the slider 20.

Referring to FIGS. 3 and 4, the slider 20 also defines a central slot 20R that extends entirely through slider 20 from the top end 20E to the channel 20Q. In the illustrated embodiment, the top end 20E and the channel 20Q are in fluid communication with one another via the central slot 20R. Upon assembly of the table saw jig 1, the central slot 20R is positioned directly above the extension 10K in which the central slot 20R is longitudinally aligned above the extension 10K. Such use of the central slot 20R along with the alignment of the central slot 20R with the extension 10K is described in more detail below.

Referring to FIG. 3, the slider 20 also defines at least one set of threaded pockets 20S extending vertically downward into the slider 20 from the top end 20E towards the bottom end 20F. In the illustrated embodiment, the slider 20 defines a first set of threaded pockets 20S1 that extends vertically downward into the slider 20 from the top end 20E toward the bottom end 20F. The first set of threaded pockets 20S1 is also separate and spaced apart from the central slot 20R. The first set of threaded pockets 20S1 is also defined intermediate of the first end 20A and the second end 20B and defined at the first side 20C of the slider 20. In the illustrated embodiment, the first set of threaded pockets 20S1 includes two threaded pockets that are longitudinally aligned with one another along an axis that is parallel with the longitudinal axis "X2" of the slider 20. Such use and purpose of the first set of threaded pockets 20S1 is described in more detail below.

Still referring to FIG. 3, slider 20 also defines a second set of threaded pockets 20S2 that extends vertically downward into the slider 20 from the top end 20E towards the bottom end 20F. The second set of threaded pockets 20S2 is also separate and spaced apart from the central slot 20R and the first set of threaded pockets 20S2. The second set of threaded pockets 20S2 is also defined intermediate of the first end 20A and the second end 20B and defined at the second side 20D of the slider 20 transversely opposite to the first set of threaded pockets 20S1. In the illustrated embodiment, the first set of threaded pockets 20S1 includes two threaded pockets that are longitudinally aligned with one another along an axis that is parallel with the longitudinal axis "X2" of the slider 20. Such use and purpose of the second set of threaded pockets 20S2 is described in more detail below.

Referring to FIGS. 2-8, the table saw jig 1 also includes a bearing assembly 30 that operably engages with the slider 20. More particularly, the bearing assembly 30 operably engages with the slider 20 at the first end 20A of the slider 20. During woodworking projects, the bearing assembly 30 is configured to slideably move an offcut side of a workpiece in a transverse direction of the table saw jig 1 to prevent improper ripping and kick back of the workpiece when cutting a thin piece of material from the workpiece. The components and parts that make up the bearing assembly 30 is described in more detail below.

Figure 6:
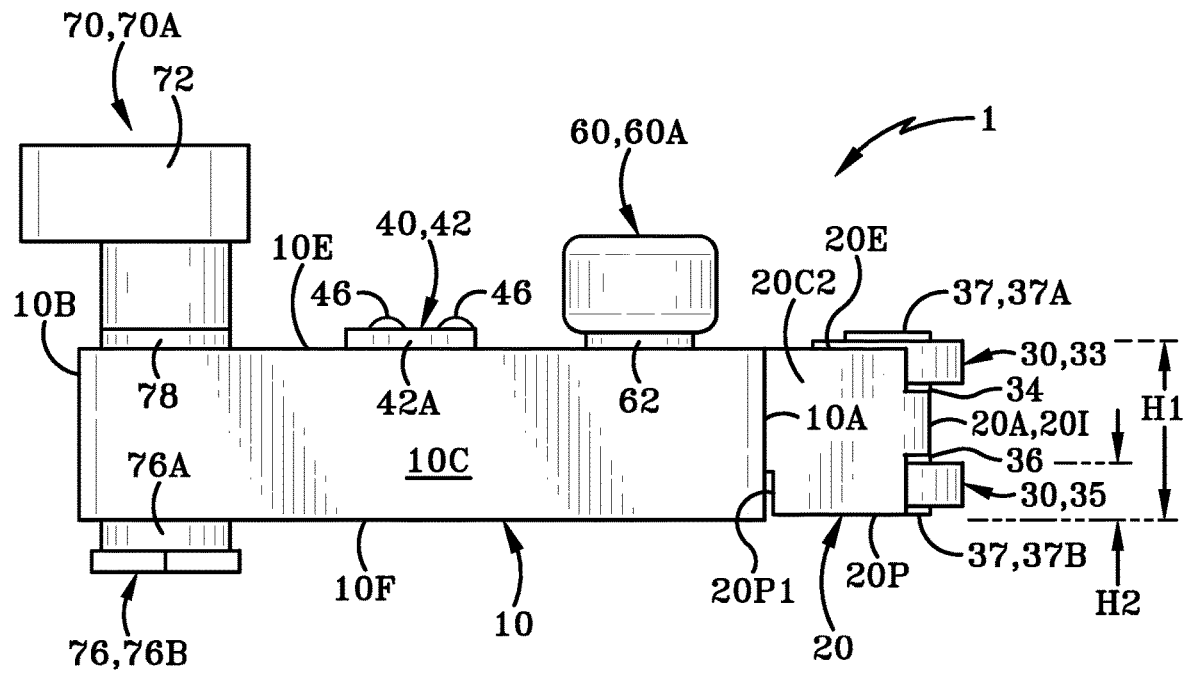
FIG. 6 (FIG. 6) is a first side elevation view of the table saw jig shown in FIG. 1.

Still referring to FIG. 5, the bearing assembly 30 also includes at least one bearing that operably engages with the slider 20. In the illustrated embodiment, the bearing assembly 30 includes a first or upper bearing 33 that operably engages with the slider 20. The upper bearing 33 is also freely rotatable with the slider 20 when an offcut side of a workpiece engages with and rotates the upper bearing 33 during operation. The upper bearing 33 may also be positioned at a first height "H1" relative to the bottom end 10F of the base 10 (see FIG. 6). Referring to FIG. 6, the bearing assembly 30 may also include a first shim 34 that may be positioned between the upper bearing 33 and the upper surface 20I1 of the dividing wall 20I. As such, the first shim 34 acts a barrier between the upper bearing 33 and the dividing wall 20I to prevent the upper bearing 33 from interfacing with or contacting the dividing wall 20I during cutting operations.

Referring to FIGS. 5 and 6, the bearing assembly 30 also includes a second or lower bearing 35 that operably engages with the slider 20 and is vertically below the upper bearing 33. Similar to the upper bearing 33, the lower bearing 35 is also freely rotatable with the slider 20 when an offcut side of a workpiece engages with and rotates the lower bearing 35 during a cutting operation. As illustrated, the lower bearing 35 is vertically aligned with the upper bearing 33 along a rotational axis that is parallel with the vertical axis "Z" of table saw jig 1. The lower bearing 35 may also be positioned at a second height "H2" relative to the bottom end 10F of the base 10 where the second height "H2" is less than the first height "H1" of the upper bearing 33 (see FIG. 6). Referring to FIG. 6, the bearing assembly 30 may also include a second shim 36 that may be positioned between the lower bearing 35 and the lower surface 20I2 of the dividing wall 20I. Similar to the first shim 34, the second shim 36 acts a barrier between the lower bearing 35 and the dividing wall 20I to prevent the lower bearing 35 from interfacing with or contacting the dividing wall 20I during cutting operations.

Referring to FIGS. 5 and 6, the upper bearing 33 and the first shim 34 are operably engaged with a first connector 37A. Specifically, the first connector 37A threadably engages the upper bearing 33 and the first shim 34 with the dividing wall 20I inside of the first recess 20G. With this structural configuration, the upper bearing 33 is freely rotatable about a longitudinal axis defined by the first connector 37A. Still referring to FIGS. 5 and 6, the lower bearing 35 and the second shim 36 are operably engaged with a second connector 37B. Specifically, the second connector 37B threadably engages the lower bearing 35 and the second shim 36 with the dividing wall 20I inside of the second recess 20K. With this structural configuration, the lower bearing 35 is also freely rotatable about a longitudinal axis defined by the second connector 37B. In other exemplary embodiments, any suitable structural engagements may be used to operably engage a first bearing and a first shim with a slider along with operably engaging a second bearing and a second shim with the slider.

During cutting operations, one or both of the upper bearing 33 and the lower bearing 35 of the bearing assembly 30 may be operably engaged with a workpiece depending on the thickness of the workpiece. In one instance, only the lower bearing 35 of the bearing assembly 30 may operably engage with a first workpiece defining a first thickness that enables only the lower bearing 35 to moveably slide an offcut side of the first workpiece along a table saw. In this instance, the first thickness of the first workpiece is less than the first height "H1" of the upper bearing 33 and is less than or equal to the second height "H2" of the lower bearing 35 (see FIG. 20A). In another instance, the upper bearing 33 and the lower bearing 35 of the bearing assembly 30 may operably engage with a second workpiece defining a second thickness that enables the upper bearing 33 and the lower bearing 35 to moveably slide an offcut side of the second workpiece along a table saw. In this instance, the second thickness of the second workpiece is greater than and/or equal to the first height "H1" of the upper bearing 33 and greater than the second height "H2" of the lower bearing 35.

The inclusion of the upper bearing 33 and the lower bearing 35 in the bearing assembly 30 is considered advantageous at least because the table saw jig 1 enables woodworkers to cut and rip various thicknesses of various types of workpiece with a single tool. The two bearing design of the bearing assembly 30 may also prevent a workpiece having a greater thickness than a thickness of a single bearing from contacting or interfacing with a portion of the slider 20, which may causing hinder linear movement of the workpiece as the workpiece travels along the table saw jig 1 during cutting operations. The two bearing design of the bearing assembly 30 may also provide greater stability and support along an offcut side of a workpiece where the workpiece defines a thickness that matches one or both of the first height "H1" and the second height "H2" of the upper bearing 33 and the lower bearing 35.

Figure 2:
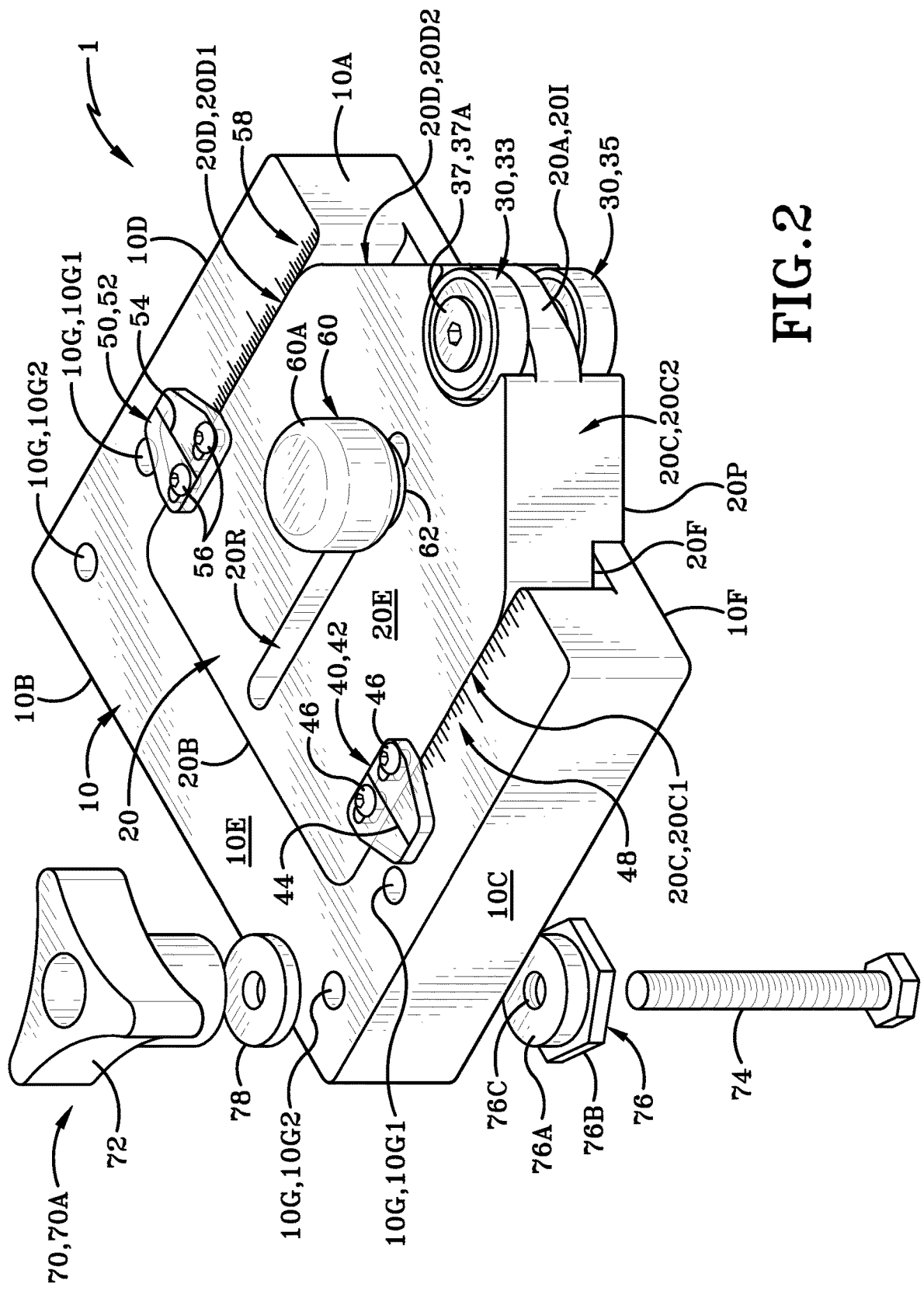
FIG. 2 (FIG. 2) is partial exploded view of at least one attachment assembly of the table saw jig.

Referring to FIGS. 1 and 2, the table saw jig 1 may also include at least one calibration assembly 40 that is provided on the base 10 and the slider 20. More particularly, the table saw jig 1 includes a first calibration assembly 40 that operably engages with a first position of the base 10 proximate to the first side 10C of the base 10 and a first position of the slider 20 proximate to the first side 20C of the slider 20. The first calibration assembly 40 is configured to the calibrate the slider 20 relative to a cutting blade of a table saw when the base 10 is operably engaged with a table of the table saw. Such components and parts that make up the first calibration assembly 40 is described in greater detail below.

Referring to FIG. 3, the first calibration assembly 40 includes a indicator 42 that operably engages with the slider 20. More particularly, the indicator 42 operably engages with the slider 20 intermediate to the first end 20A and the second end 20B and proximate to the first side 20C. The indicator 42 defines a first end 42A remote from the slider 20, a second end 42B opposite to the first end 42A and positioned proximate to the slider 20, and a longitudinal axis defined therebetween. The indicator 42 also defines a first set of oblong openings 42C defined proximate to the second end 42B of the indicator 42. Each oblong opening of the first oblong openings 42C extends along a transverse axis that is perpendicular to the longitudinal axis of the first indicator. Each oblong opening of the set of first oblong openings 42C is also transversely aligned with one another on the indicator 42. Such use and purpose of the indicator 42 is described in greater detail below.

Still referring to FIG. 3, the first calibration assembly 40 further includes a cursor 44 on the indicator 42. In the illustrated embodiment, the cursor 44 extends from the first end 42A of the indicator 42 to the second end 42B of the indicator 42. In the illustrated embodiment, the indicator 42 is a transparent material while the cursor 44 is made of an opaque material to visibly see the cursor 44 when operating the first calibration assembly 40; such difference in materials between the indicator 42 and the cursor 44 is described in more detail below.

Still referring to FIG. 3, the first calibration assembly 40 further includes connectors 46 that operably engage the indicator 42 with the slider 20. More particularly, the connectors 46 passes through the first set of oblong opening 42C defined in the indicator 42 and threadably engage with the first set of threaded pockets 20S1 of the slider 20 to operably engage the indicator 42 with the slider 20 (see FIG. 2). During a woodworking project, a woodworker may loosen the connectors 46 until the connectors 46 are disengaged from the indicator 42 to move the indicator 42 along the longitudinal axis "X2" of the slider 20 inside of the first set of oblong openings 42C for calibration purposes, which are described in more detail below.

Still referring to FIG. 3, the first calibration assembly 40 further includes a first set of measurement markings 48 that are provided on the top end 10E of the base 10 proximate to the first side 10C of the base 10. The first set of measurement markings 48 defines individual measurement markings that reference to the position of the slider 20 relative to the base 10. Such use and operation of the first set of measurement markings 48 with indicator 42 is described in more detail below. The first set of measurement markings 48 may also utilize a first unit measurement system, such as the imperial unit system. In other exemplary embodiment, the first set of measurement markings 48 may use any suitable unit measurement system for measuring a distance of a slider relative to a base during woodworking projects.

Referring to FIG. 2, the table saw jig 1 may also include a second calibration assembly 50 that that operably engages with a second position of the base 10 proximate to the second side 10D of the base 10 and a second position of the slider 20 proximate to the second side 20D of the slider 20; as such, the second calibration assembly 50 is disposed transversely opposite to the first calibration assembly 40 on the base 10 and the slider 20. Similar to the first calibration assembly 40, the second calibration assembly 50 is configured to the calibrate the slider 20 relative to a blade of the table saw when the base 10 is operably engaged with a table of a table saw. As described in more detail below, the second calibration assembly 50 is configured to calibrate the slider 20 relative to a blade of a table saw separately and independently of the first calibration assembly 40.

It should be understood that the second calibration assembly 50 is substantially similar to the first calibration assembly 40. As such, a indicator 52 of the second calibration assembly 50 having a first end 52A remote from the slider 20, a second end 52B opposite to the first end 52A and positioned proximate to the slider 20, and a longitudinal axis defined therebetween are substantially similar to the indicator 42 of the first calibration assembly 40 having the first end 42A, the second end 42B, and the longitudinal axis defined therebetween. The indicator 52 also defines a second set of oblong openings 52C defined proximate to the second end 52B of the indicator 52 substantially similar to the first set of oblong openings 42C defined proximate to the second end 42B of the indicator 42. The second calibration assembly 50 also includes connectors 56 that operably engage the indicator 52 with the slider 20 via the second set of oblong openings 52C and the second set of threaded pockets 20S2 substantially similar to the connectors 46 operably engaging the indicator 42 with the slider 20 via the first set of oblong openings 42C and the first set of threaded pockets 20S1.

Still referring to FIG. 2, the second calibration assembly 50 also includes a second set of measurement markings 58 provided on the base 10 substantially similar to the first set of measurement markings 48 provided on the base 10. In the illustrated embodiment, the second set of measurement markings 58 are provided on the base 10 proximate to the second side 10D of the base 10 opposite to the first set of measurement markings 48 on the base 10. The second set of measurement markings 58 also defines a second unit measurement system different than the first unit measurement system defined by the first set of measurement markings 48; the second unit measurement system used by the second set of measurement markings 58 is the metric unit system.

During a woodworking project, a woodworker may use either the first calibration assembly 40 or the second calibration assembly 50 when using the table saw jig 1 to guide a workpiece along a table of a table saw. Once woodworker chooses a calibration assembly, the woodworker may then adjust the indicator, 42, 52 to the nearest whole measurement marking of the set of measurement markings 48, 58 to accurately and precisely adjust the slider 20 relative to a blade of a table saw. Such adjustment of the indicator 42, 52 is provided by loosening the connectors 46, 56 from the indicator 42, 52 until the indicator 42, 52, is moveable via the set of oblong openings 42C, 52C. Once the cursor 44, 54 is substantially aligned with the nearest whole measurement marking of the set of measurement markings 48, 58, the connectors 46, 56 may then be tightened to the indicator 42, 52 until the indicator 42, 52 is secured with the slider 20. At this point, the woodworker may then selectively adjust the slider 20 relative to the base 10 to a desired distance, via the selected calibration assembly 40, 50, for guiding an offcut end of the workpiece along the table of the table saw.

Referring to FIG. 3, the table saw jig 1 includes a locking knob 60 that operably engages with the base 10 and the slider 20. As described in more detail below, the locking knob 60 is selectively engaged with the slider 20 for enabling a slider 20 to be maintained with the base 10 or freely moveable along the longitudinal axis "X1" of the base 10. In one instance, the slider 20 may be maintained with the base 10 when the locking knob 60 is operably engaged with the base 10, via the threaded opening 10L, and the top end 20E of the slider 20. In another instance, the slider 20 may be freely moveable along the longitudinal axis "X1" of the base 10 when the locking knob 60 is disengaged from the top end 20E of the slider 20. The features and characteristics of the locking knob 60 are described in more detail below.

Referring to FIG. 3, the locking knob 60 includes a knob 60A that is configured to loosen and tighten the locking knob 60 from the base 10 and/or the slider 20. The locking knob 60 also includes a threaded shaft 60B that extends downwardly from knob 60A and configured to threadably engage with the base 10 via the threaded opening 10L. In the illustrated embodiment, the threaded shaft 60B passes through the central slot 20R of the slider 20 towards the extension 10K of the base 10 until the threaded shaft 60B threadably engages with the threaded opening 10L (see FIG. 11). The locking knob 60 also includes a washer 62 that is positioned on the threaded shaft 60B and located between the knob 60A and the top end 20E of the slider 20 upon assembly of the table saw jig 1. During a woodworking project, the knob 60A may press the washer 62 against the top end 20E of the slider 20 when the locking knob 60 is used to maintain the slider 20 with the base 10. During the same woodworking project, the knob 60A may release the washer 62 from the top end 20E of the slider 20 to enable a woodworker to linearly move the slider 20 along the base 10.

Referring to FIG. 2, the table saw jig 1 may also include at least one attachment assembly 70 that selectively engages and adjusts the base 10 with a miter slot of a table of a table saw. The at least one attachment assembly 70 also operably engages with the at least one pattern of openings 10G defined in the base 10. In the illustrated embodiment, the table saw jig 1 includes a first attachment assembly 70A that operably engages with the base 10 via one of the first pattern of openings 10G1 and the second pattern of openings 10G1 at the first side 10C of the base 10. The table saw jig 1 also includes a second attachment assembly 70B that operably engages with the base 10 via one of the first pattern of openings 10G1 and the second pattern of openings 10G1 at the second side 10D of the base 10. The first attachment assembly 70A and the second attachment assembly 70B are substantially similar to one another and operably engage with the base 10 in the same orientation. Inasmuch as the first attachment assembly 70A and the second attachment assembly 70B are substantially similar, the following description relates to the first attachment assembly 70A. It should be understood that the description of the first attachment assembly 70A is equal to the second attachment assembly 70B.

Referring to FIG. 2, the first attachment assembly 70A includes a handle 72, a screw 74 operably engaged with the handle 72, a slot nut 76 threadably engaged with the screw 74 at a locate remote from the handle 72, and a washer 78 positioned on the screw 74 and located between the handle 72 and the top end 10E of the base 10 when the table saw jig 1 is assembled. Upon assembly of the table saw jig 1, the handle 72 is positioned vertically above the top end 10E of the base 10 while the screw 74 is feed vertically upward into the base 10 from the bottom end 10F to the top end 10E via an opening from one of the first pattern of openings 10G1 and the second pattern of openings 10G2. Upon assembly of the table saw jig 1, the slot nut 76 is operably engaged with a head of the screw 74 vertically below the bottom end 10F of the base 10. The slot nut 76 is also sized and configured to selectively operably engage the base 10 with a miter slot of a table saw. In one instance, the base 10 is freely moveable along a miter slot of a table saw when the slot nut 76 is loosened from the screw 74 and is positioned a first distance away from the bottom end 10F of the base 10 free from engaging the table saw inside the miter slot. In another instance, the base 10 is maintained at a desired position on a table saw when the slot nut 76 is tightened by the screw 74 and is positioned a second distance away from the bottom end 10F of the base 10 that engages the table saw inside the miter slot; the second distance of the slot nut 76 relative to the base 10 is less than the first distance of the slot nut 76 relative to the base 10.

As illustrated in FIG. 2, each slot nut 76 of the first attachment assembly 70A and the second attachment assembly 70B includes a first portion 76A, a second portion 76B that extends downwardly from the first portion 76A, and a passageway 76C that extends entirely through each slot nut 76 from the first portion 76A to the second portion 76B. In the illustrated embodiment, the first portion 76A and the second portion 76B of each slot nut 76 collectively define a T-shaped configuration to be received by a T-shaped miter slot of a table saw, which is described in more detail below. The passageway 76C is also configured to receive the threaded shaft of the screw 74 but restrict access to the head of the screw 74 to enable the head of the screw 74 and the slot nut 76 to operably engage with one another.

During a woodworking project, a woodworker may also selectively engage the first attachment assembly 70A and the second attachment assembly 70B with one of the first pattern of openings 10G1 and the second pattern of openings 10G2 dependent on the miter slot configuration defined in a table of a table saw. In one instance, a woodworker may selectively engage the first attachment assembly 70A and the second attachment assembly 70B with the first pattern of openings 10G1 when a table of a table saw defines a first miter slot configuration measured at a first distance away from a cutting blade of the table saw. In another instance, a woodworker may selectively engage the first attachment assembly 70A and the second attachment assembly 70B with the second pattern of openings 10G2 when a table of a table saw defines a second miter slot configuration measured at a second distance away from a cutting blade of the table saw. In comparison, the second distance of the second miter slot configuration is greater than the first distance of the first miter slot configuration. Generally, a woodworker may selectively engage the first attachment assembly 70A and the second attachment assembly 70B with the the first pattern of openings 10G1 when the table saw jig 1 is used with a table saw having the first miter slot configuration measured at the first distance away from a cutting blade of the table saw. A woodworker may also selectively engage the first attachment assembly 70A and the second attachment assembly 70B with the second pattern of openings 10G2 when the table saw jig 1 is used with a table saw having the second miter slot configuration measured at the second distance away from a cutting blade of the table saw.

Having now described the assemblies and components of the table saw jig 1, methods of guiding an offcut side of a workpiece with the table saw jig 1 are described in further detail below.

Figure 13:
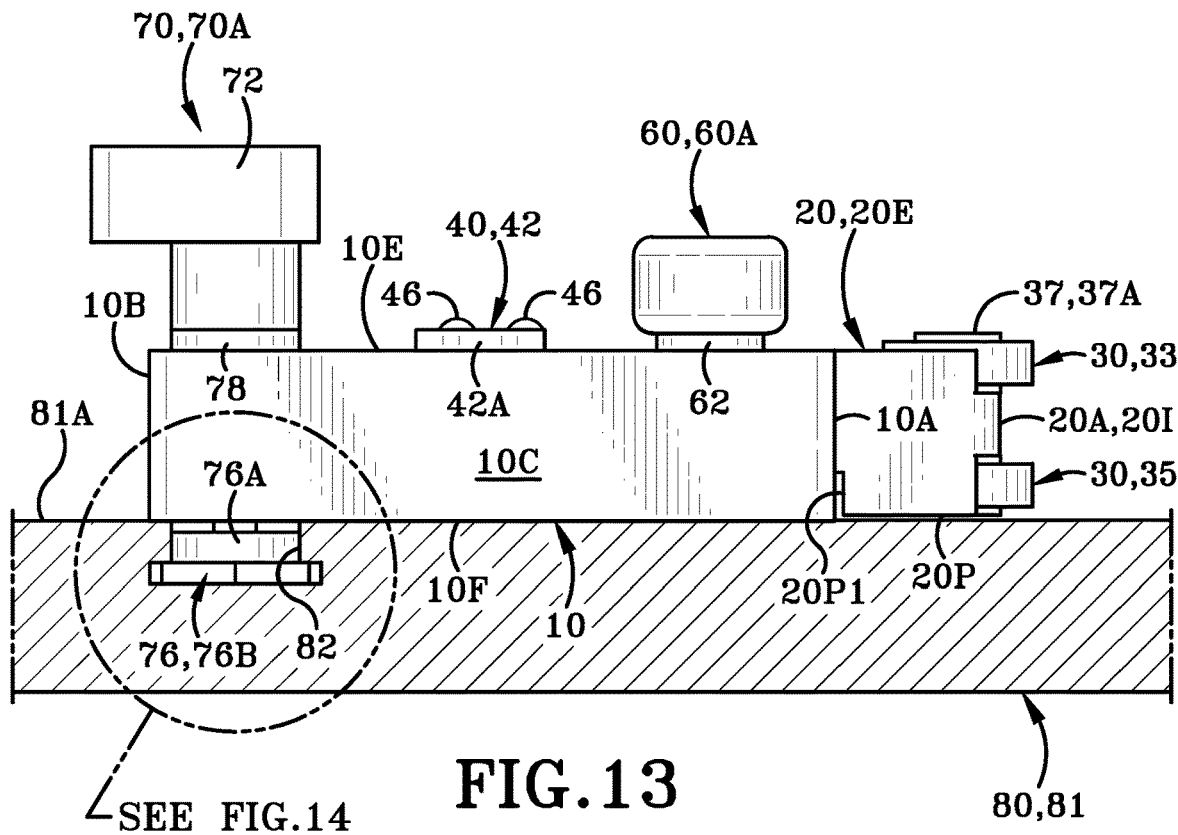
FIG. 13 (FIG. 13) is a sectional view of the table saw taken in the direction of lines 13-13 shown in FIG. 12 and is a right elevation view of the table saw jig.
Figure 14:
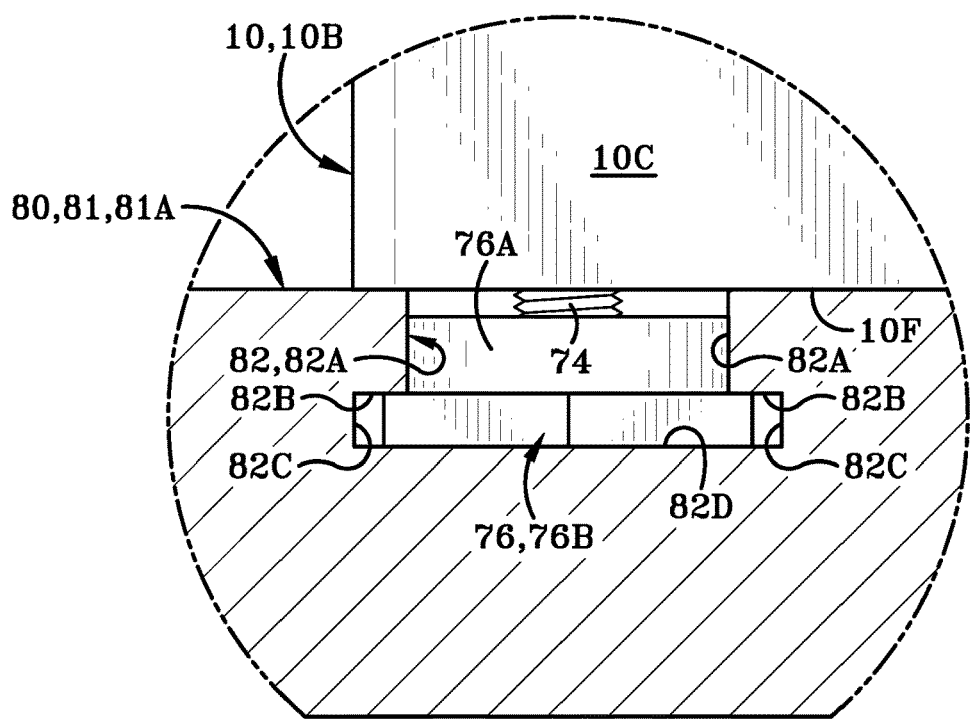
FIG. 14 (FIG. 14) is an enlargement of the highlighted region in FIG. 13.

Prior to cutting and/or ripping a workpiece, the table saw jig 1 is introduced to and operably engaged with a table saw generally referred to as 80. More particularly, the slot nut 76 of at least one of the first attachment assembly 70A and the second attachment assembly 70B operably engages with the table saw 80 via a T-shaped miter slot 82 defined in a table top 81 of the table saw 80. Referring to FIG. 14, the T-shaped miter slot 82 is collectively defined by a pair of upper walls 82A, a pair of intermediate walls 82B, a pair of lower walls 82C, and a base wall 82D. As seen in FIG. 14, each upper wall of the pair of upper walls 82A is spaced apart from one another and extend downwardly to the pair of intermediate walls 82B. Each intermediate wall of the pair of intermediate walls 82B is also spaced apart from one another and extend transversely to the pair of lower walls 82C where the pair of intermediate walls 82B is orthogonal to the pair of upper walls 82A. Each lower wall of the pair of lower walls 82C is also spaced apart from one another and extends downwardly from the pair of intermediate walls 82B to the base wall 82D where the pair of lower walls 82C is parallel with the pair of upper walls 82A. As illustrated in FIGS. 13 and 14, the slot nut 76 defines a T-shaped configuration that is complementary with and/or matches the T-shaped miter slot 82 defined in the table saw 80 to enable engagement between the table saw jig 1 and the table saw 80. In the illustrated embodiment, the slot nuts 76 of the first attachment assembly 70A and the second attachment assembly 70B operably engaged with the same T-shaped miter slot 82 defined in the table saw 80 to operably engage the table saw jig 1 to the table saw 80.

Additionally, the slot nuts 76 of the first attachment assembly 70A and the second attachment assembly 70B may be disengaged from the handles 72 and the screws 74 of the first attachment assembly 70A and the second attachment assembly 70B to enable a woodworker to slide the slot nuts 76 into the T-shaped miter slot 82. Stated differently, the slot nuts 76 of the first attachment assembly 70A and the second attachment assembly 70B may be positioned at a distance away from the bottom end 10F of the base 10 to prevent the base 10 from hindering the woodworker from engaging the slot nuts 76 with the T-shaped miter slot 82. Once engaged, the woodworker then longitudinally slides the table saw jig 1 along an engagement surface 81A of the table top 81 via the T-shaped miter slot 82; the longitudinal movement of the table saw jig 1 enabled by the T-shaped miter slot 82 is denoted by an arrow labeled "LM1" in FIG. 12.

The woodworker may then releasably secure the table saw jig 1 with the T-shaped miter slot 82 once the table saw jig 1 is proximate to a cutting blade 84 of the table saw 80. Once proximate to the cutting blade 84, the woodworker then applies first rotational forces on the handle 72 of the first attachment assembly 70A and the second attachment assembly 70B to releasably secure the table saw jig 1 with the table saw 80; the first rotational forces applied to the handles 72 are denoted by double arrows labeled "B" in FIG. 12. In this event, the handles 72 rotationally move the screws 74 linearly upward, along with the slot nut 76, until the slot nuts 76 are engaged with the table saw 80 inside of the T-shaped miter slots 82 and maintain the table saw jig 1 at a desired position on the table saw jig 1. More specifically, the handles 72 rotationally move the screws 74 linearly upward, along with the slot nut 76, until the second portions 76B of the slot nut 76 operably engage with the pair of intermediate walls 82B inside of the table saw 80 to maintain the table saw jig 1 at a desired position on the table saw jig 1. At this point, the table saw jig 1 is now releasably secured with the table saw 80 proximate to the cutting blade 84 and is ready for calibration operations.

Figure 15:
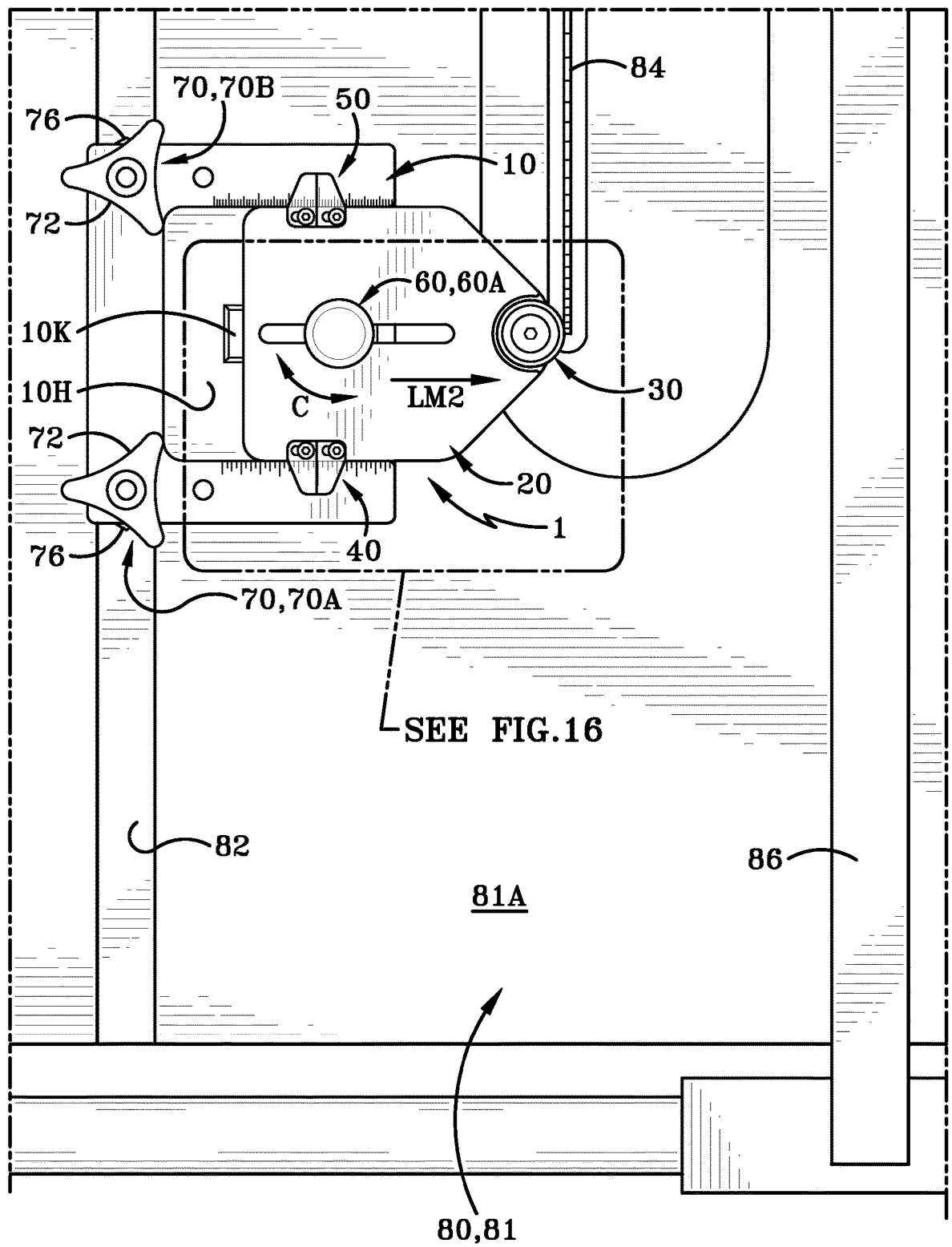
FIG. 15 (FIG. 15) is another operational view similar to FIG. 12, but the slider of the table saw jig is linearly moved towards a cutting blade of the table saw until the slider touches the cutting blade.

As best seen in FIG. 15, the woodworker then begins the calibration process of the table saw jig 1 by linearly siding the slider 20 away from the base 10 and towards the cutting blade 84. Prior to linearly sliding the slider 20, the woodworker disengages the locking knob 60 from the slider 20 by applying a first rotational force on the knob 60A of the locking knob 60 to loosen the locking knob 60; such first rotational force applied on the knob 60A of the locking knob 60 is denoted by a double arrow labeled "C" in FIG. 15. The woodworker may continue to apply this first rotational force on the locking knob 60 until the knob 60A and the washer 62 is disengaged from the top end 20E of the slider 20 and the slider 20 is freely moveable relative to the base 10. The keyed mechanism provided between the extension 10K of the base 10 and the channel 20Q of the slider 20 enables the slider 20 to remain centered within the base 10 when traveling inwardly and outwardly of the base 10. In other words, the extension 10K of the base 10 and the channel 20Q of the slider 20 creates a self-centering mechanism between the slider 20 and the base 10 during calibration operations. Such linearly sliding of the slider 20 is denoted by an arrow labeled "LM2" in FIG. 15. The woodworker may slidably move the slider 20 away from the base 10 and towards the cutting blade 84 until one or both of the upper bearing 33 and the lower bearing 35 touches and/or abuts at least one cutting tooth of the cutting blade 84.

Once touching, the woodworker then applies a second rotational force on the knob 60A of the locking knob 60 to reengage the knob 60A and the washer 62 with both the base 10 and the slider 20. The second rotational force applied on the knob 60A of the locking knob 60 is denoted by the double arrow labeled "C" in FIG. 15, but the second rotational force is opposite to the first rotational force as described above. The woodworker may continue applying this second rotational force on the locking knob 60 until the knob 60A forces the washer 62 to reengaged with the slider 20 and the slider 20 is restricted and/or maintained relative to the base 10. At this point, the woodworker then continue the calibration operation of the table saw jig 1 via one of the first calibration assembly 40 and the second calibration assembly 50.

Figure 16:
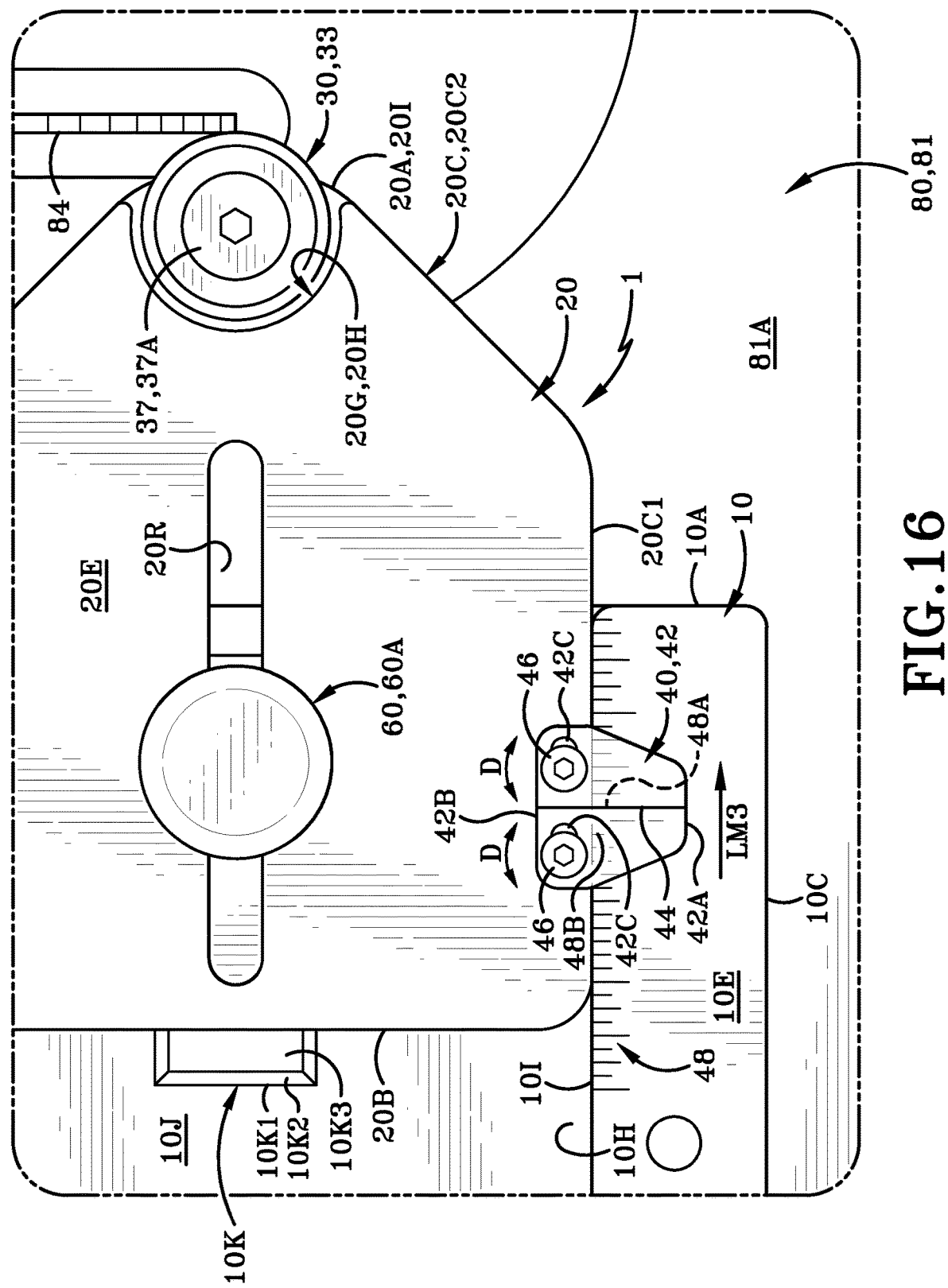
FIG. 16 (FIG. 16) is an enlargement view highlighted in FIG. 15.

As best seen in FIG. 16, the woodworker may then choose between using the first calibration assembly 40 and the second calibration assembly 50 depending on the woodworker's preference. In the illustrated embodiment, the first calibration assembly 40 is being used in the calibration operation; it should be understood that the operational functions of the first calibration assembly 40 applies equally to the second calibration assembly 50 if chosen by the woodworker. Once the first calibration assembly 40 is chosen, the woodworker may align the cursor 44 of the indicator 42 with the nearest whole measurement marking of the first set of measurement markings 48 by disengaging the connectors 46 from the indicator 42 to enable movement of the indicator 42. Here, the woodworker applies a first rotational movement on one or both of connectors 46 until one or both of the connectors 46 are disengaged from the indicator 42; such first rotational movement of one or both of the connectors 46 is denoted by a double arrow labeled "D" in FIG. 16. In the illustrated embodiment, the woodworker would desire to disengage both connectors 46 from the indicator 42 in order to freely move the indicator 42 along the top end 20E of the slider 20 to align the cursor 44 with the nearest whole measurement marking of the first set of measurement markings 48. Such linear movement of the indicator 42 is denoted by an arrow labeled "LM3" in FIG. 16. As shown in FIG. 16, the woodworker would terminate this linear movement of the indicator 42 once the cursor 44 is directly aligned with the nearest whole measurement marking of the first set of measurement markings 48.

Once the cursor 44 is aligned with the nearest whole measurement marking of the first set of measurement markings 48, the woodworker then applies a second rotational force on the connectors 46 to reengage the indicator 42 with the slider 20. The second rotational force applied on the connectors 46 is denoted by the double arrow labeled "D" in FIG. 16, but the second rotational force is opposite to the first rotational force as described above. The woodworker may continue applying this second rotational force on the connectors 46 until the connectors 46 reengage with the indicator 42 and the indicator 42 is restricted and/or maintained with the slider 20.

Such alignment capabilities provided by the first calibration assembly 40 and the second calibration assembly 50 enable a woodworker to precisely adjust the slider 20 relative to the base 10 by accurately aligning the slider 20 at a desired depth inside of the base 10 to perform accurate thin cuts on various types of workpiece. Here, the woodworker is able to use whole measurement markings on the first set of measurement markings 48 to accurately align the slider 20 with the base 10 regardless of the table saw configuration (i.e., distance between miter slots of a table saw and a cutting blade of the table saw). As such, the first calibration assembly 40 and the second calibration assembly 50 removes guessing and/or inaccurate depths of setting the slider 20 to a desired depth inside of the base 10 by enabling the woodworker to use whole measurements during woodworking projects.

Figure 17:
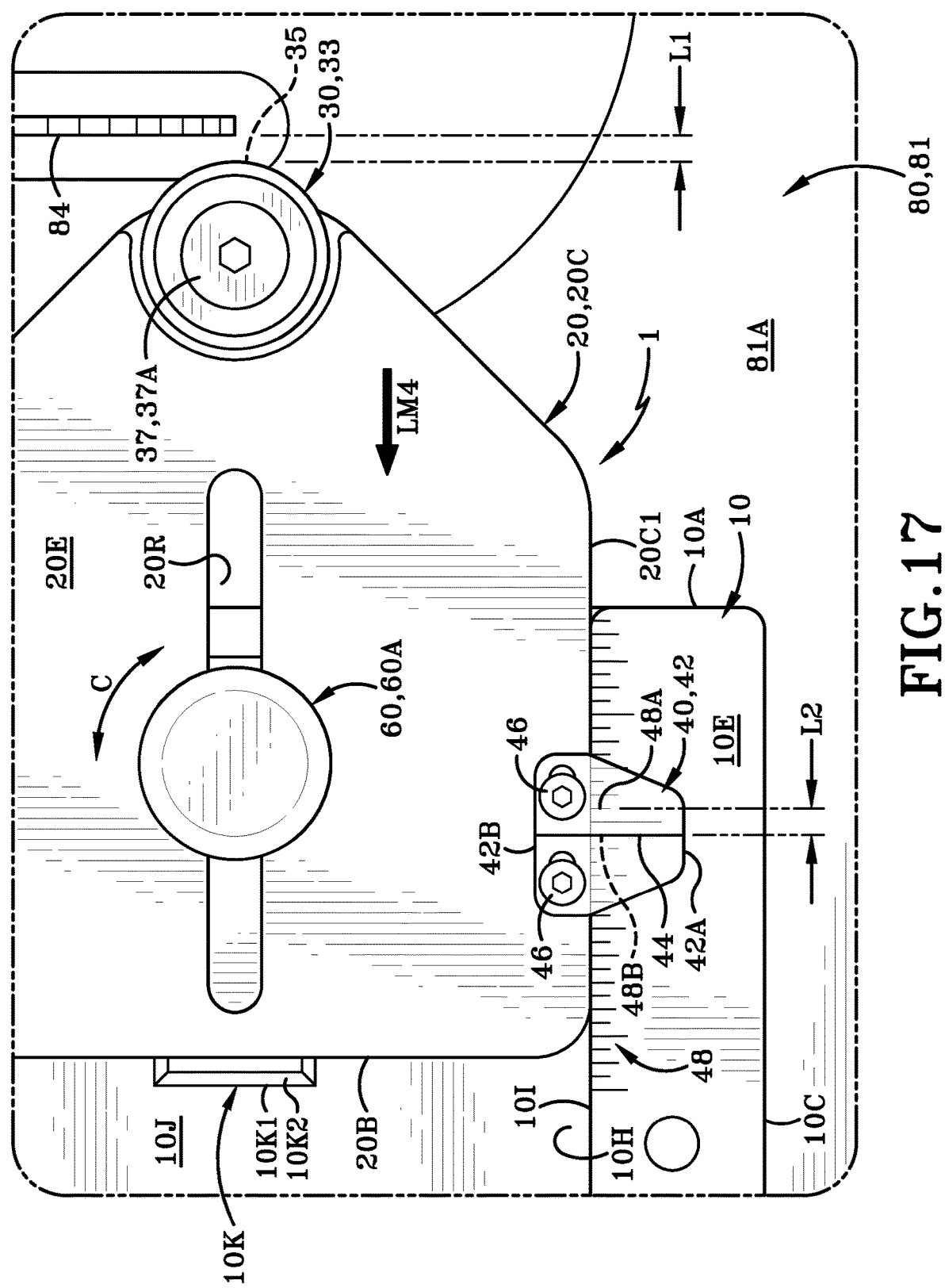
FIG. 17 (FIG. 17) is another operational view similar to FIG. 15, but the slider of the table saw jig is linearly moved away from the cutting blade of the table saw to a desired distance away from the cutting blade.

Referring to FIG. 17, the woodworker may then linearly adjust the slider 20 relative to the base 10 via the first calibration assembly 40. By collectively calibrating the indicator 42 and the cursor 44 with nearest whole measurement marking of the first set of measurement markings 48, the woodworker is enabled to accurately align the slider 20 at a suitable depth relative to the base 10 and/or the cutting blade 84 for cutting a thin portion of material from a workpiece. Prior to adjusting the slider 20, the woodworker again disengages the locking knob 60 from the slider 20 by applying the first rotational force on the knob 60A of the locking knob 60 to loosen the locking knob 60 similar to the first rotational force described above; such first rotational force applied on the knob 60A of the locking knob 60 is denoted by a double arrow labeled "C" in FIG. 17. The woodworker may continue applying this first rotational force on the locking knob 60 until the knob 60A and the washer 62 are disengaged from the slider 20 and the slider 20 is freely moveable relative to the base 10.

At this point, the woodworker may set the slider 20 at any suitable depth relative to the base 10 and/or at any suitable distance away from the cutting blade 84. As best seen in FIG. 17, the woodworker linearly moves the slider 20 into the cavity 10H away from the cutting blade 84 at a desired position that is accurately measured via the first calibration assembly 40. More particularly, the combination of the cursor 44 and the first set of measurement markings 48 enables the woodworker to set the upper bearing 33 and the lower bearing 35 at a desired distance away from the cutting blade 84 by the combination of the cursor 44 and the first set of measurement markings 48. Such linear movement of the slider 20 relative to the base 10 is denoted by an arrow labeled "LM4" in FIG. 17. As best seen in the FIG. 17, the woodworker sets the upper bearing 33 and the lower bearing 35 away from the cutting blade 84 at the desired distance which matches the distance traveled between a first measurement mark 48A initially pointed at by the cursor 44 to a second measurement mark 48B pointed at by the cursor 44 upon movement of the slider 20 away from the cutting blade 84. Such desired distance measured between the upper bearing 33 and the lower bearing 35 and the cutting blade 84 is denoted by arrows labeled "L1" in FIG. 17, and the distance measured between the first measurement mark 48A and the second measurement mark 48B is denoted by arrows labeled "L2" in FIG. 17 where both distances "L1", L2" are equal to one another.

Once the desired distance is set, the woodworker then applies a second rotational force on the knob 60A of the locking knob 60 to reengage the locking knob 60 with both the base 10 and the slider 20. The second rotational force applied on the knob 60A of the locking knob 60 is denoted by the double arrow labeled "C" in FIG. 17, but the second rotational force is opposite to the first rotational force as described above. The woodworker may continue applying this second rotational force on the locking knob 60 until the knob 60A forces the washer 62 to reengage with the slider 20 and the slider 20 is restricted and/or maintained relative to the base 10. At this point, the woodworker has completed the calibration operation and may introduce a workpiece to the table saw jig 1 for accurately cutting a thin piece of material from the workpiece.

Figure 18:
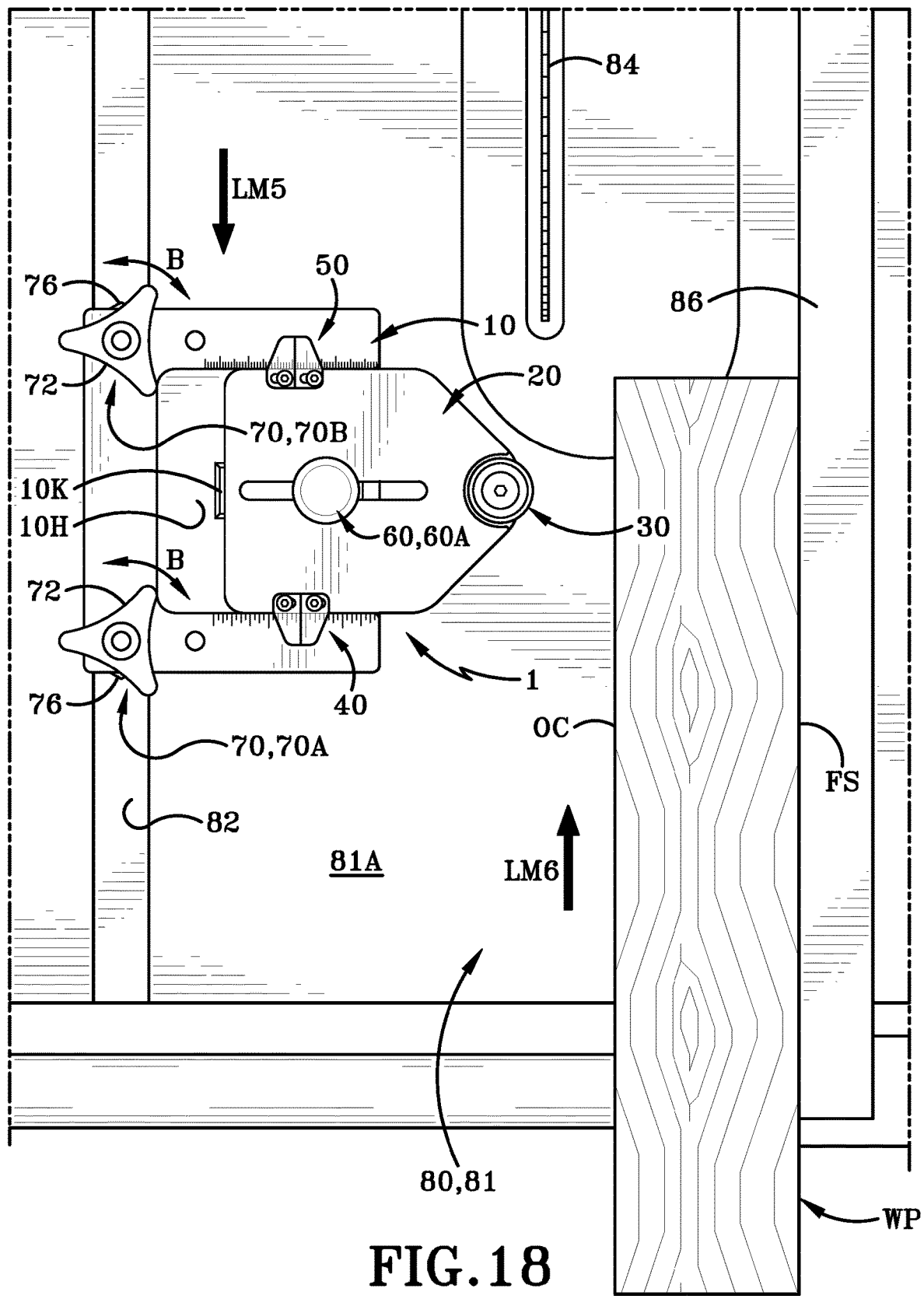
FIG. 18 (FIG. 18) is another operational view similar to FIG. 17, but the table saw jig is linearly moved along the table saw away from the cutting blade and a workpiece is introduced to the table saw.
Figure 19:
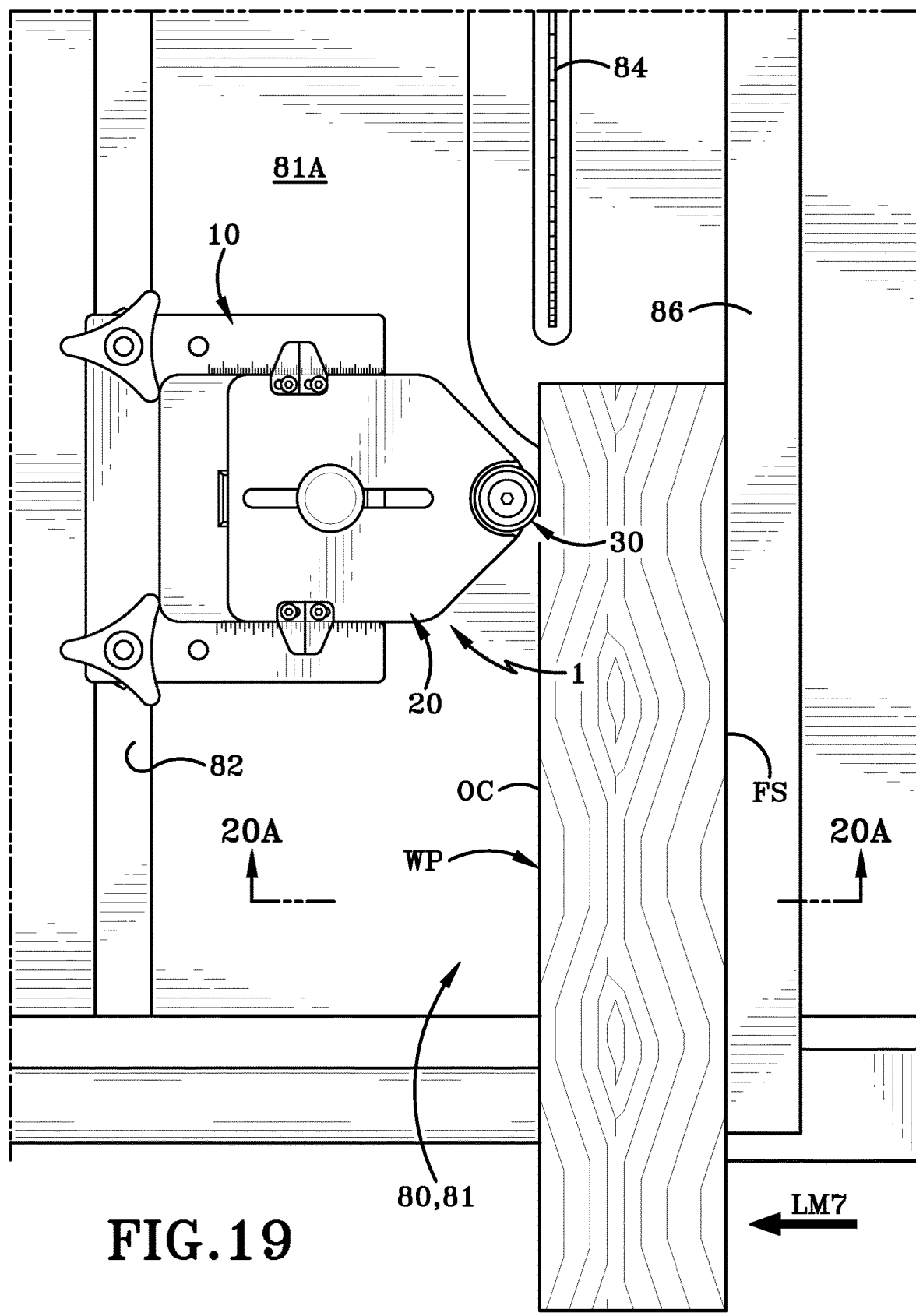
FIG. 19 (FIG. 19) is another operational view similar to FIG. 18, but a fence stop of the table saw jig and the workpiece are moved linearly towards the table saw jig until an offcut side of the workpiece operably engages with the table saw jig.

Prior to introducing a workpiece, the woodworker may longitudinally slide the table saw jig 1 along the T-shaped miter slot 82 away from the cutting blade 84. The woodworker may desire to move the table saw jig 1 away from the cutting blade 84 to provide suitable guidance and support along the workpiece while also preventing kickback of the workpiece when the workpiece is being cut. As such, the woodworker may disengage one or both of the slot nuts 76 of the first attachment assembly 70A and the second attachment assembly 70B to longitudinally slide the table saw jig 1 along the T-shaped miter slot 82. As best seen in FIG. 18, the woodworker applies the first rotational forces of the handles 72 of the first attachment assembly 70A and the second attachment assembly 70B until the slot nuts 76 disengage the table saw 80 and enable the table saw jig 1 to freely move. Such first rotational force applied on the handles 72 is denoted by "B" in FIG. 18, which is substantially similar to the rotational movement of the handles 72 previously described above. Such linear movement of the table saw jig 1 is also denoted by an arrow labeled "LM5" in FIG. 18.

The woodworker may then releasably secure the table saw jig 1 with the T-shaped miter slot 82 once the table saw jig 1 is moved to the desired position on the table saw 80 away from the cutting blade 84. Once positioned away from the cutting blade 84, the woodworker then applies a second rotational force on the handle 72 of the first attachment assembly 70A and the second attachment assembly 70B to releasably secure the table saw jig 1 with the table saw 80; the second rotational force applied to the handles 72 are denoted by double arrows labeled "B" in FIG. 18, which is opposite to the first rotational force described above. In this event, the handles 72 rotationally move the screws 74 linearly upward along with the slot nut 76 until the slot nuts 76 are engaged with the table saw 80 inside of the T-shaped miter slots 82 and maintain the table saw jig 1 at the desired position on the table saw 80. At this point, the table saw jig 1 is now releasably secured with the table saw 80 at the desired position away from the cutting blade 84 and is ready for cutting a workpiece.

Still referring to FIG. 18, the woodworker may initially introduce a workpiece "WP" to the table saw 80. More particularly, the woodworker may initially introduce a first outer side or fence side "FS" of the workpiece "WP" to a fence stop 86 of the table saw 80. As illustrated in FIG. 18, the woodworker longitudinally slides the workpiece "WP" along the fence stop 86 enough so that the workpiece "WP" is proximate to the cutting blade 84 but not engaging the cutting blade 84; such movement of the workpiece "WP" along the fence stop 86 is denoted by an arrow labeled "LM6".

Once engaged with the fence stop 86, the woodworker may then transversely adjust the fence stop 86 to a desired position relative to the cutting blade 84 while the workpiece "WP" is engaged with the fence stop 86. Such movement of the fence stop 86 and the workpiece "WP" is denoted by an arrow labeled "LM7" in FIG. 19. The woodworker may transversely move the fence stop 86 and the workpiece "WP" until a second outer side or offcut side "OC" of the workpiece "WP" touches and/or engages with one or both of the upper bearing 33 and the lower bearing 35; the offcut side "OC" is parallel with the fence side "FS". Once the offcut side "OC" engages one or both of the upper bearing 33 and the lower bearing 35, the woodworker is enabled to stop moving the fence stop 86 and engage the fence stop 86 at this position. At this point, the woodworker may then push the workpiece "WP" into the cutting blade 84 while being guided by both the fence stop 86 and the table saw jig 1 at both the fence side "FS" and the offcut side "OS" (best seen in FIG. 21). Such movement of the workpiece "WP" along the table saw jig 1 and the fence stop 86 is denoted by an arrow labeled "LM8" in FIG. 21.

Figure 20A:
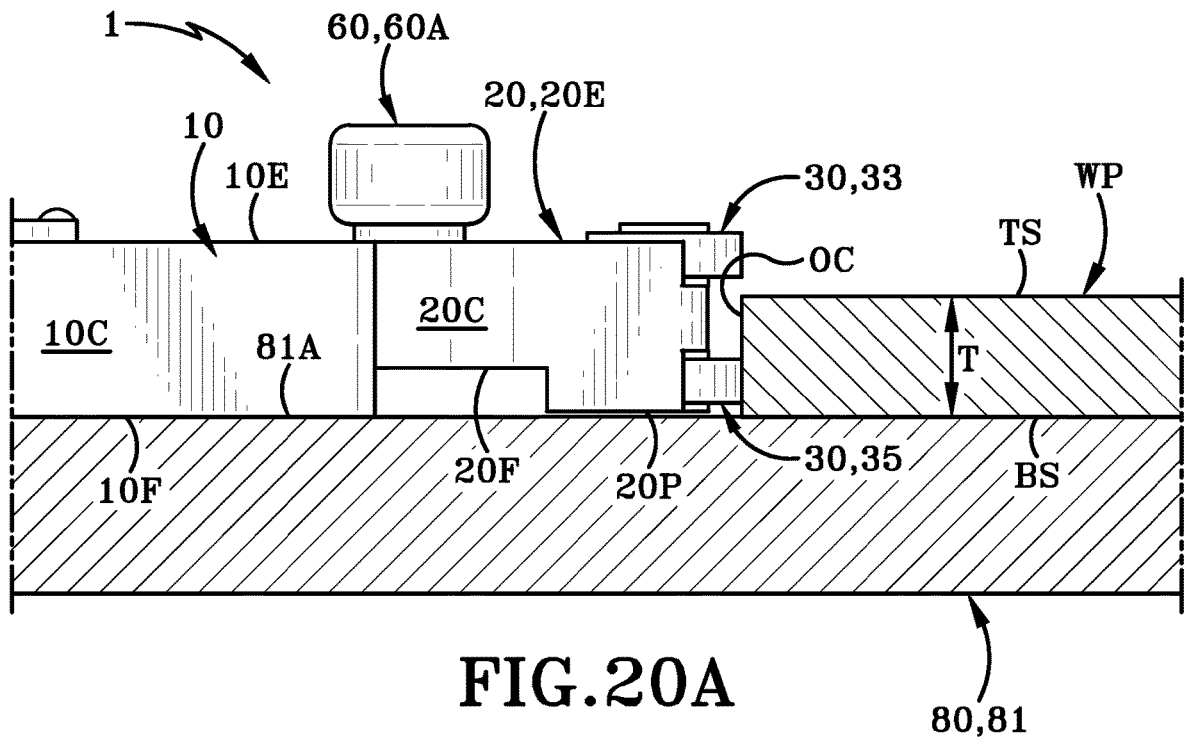
FIG. 20A (FIG. 20A) is a transverse sectional view taken in the direction of lines 20A-20A as shown in FIG. 19, wherein the workpiece defines a first thickness operably engages with a first bearing of the table saw jig.
Figure 20B:
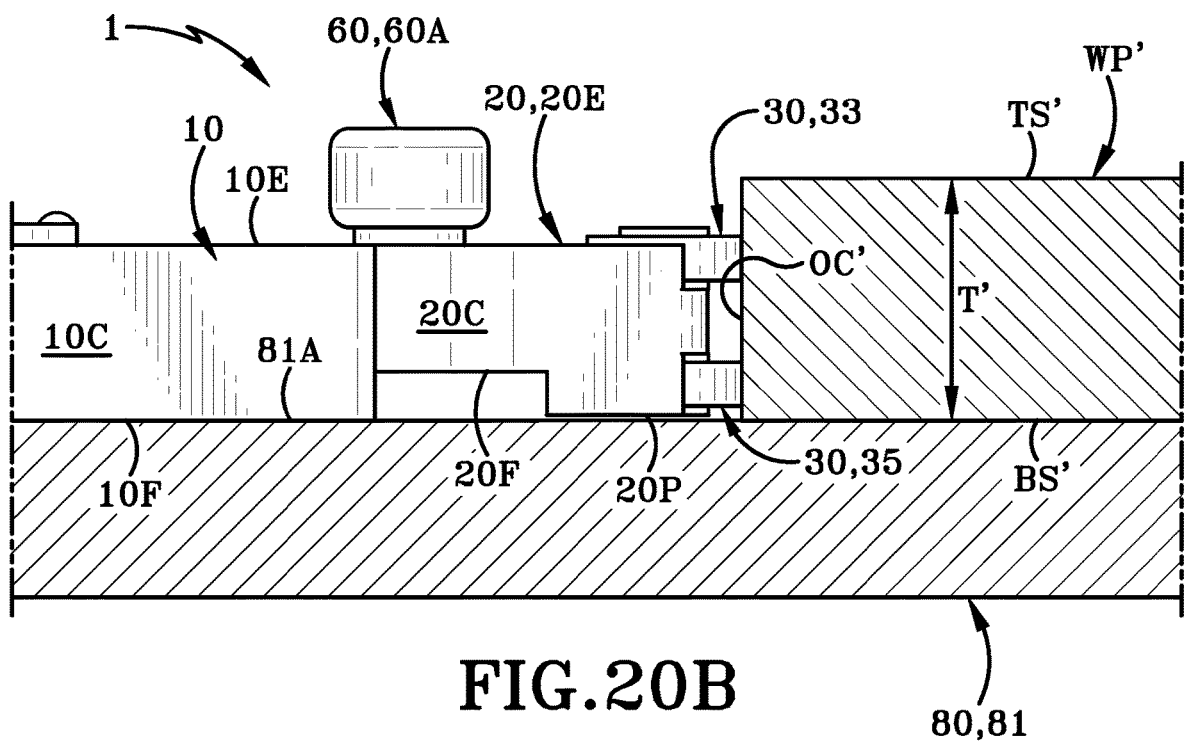
FIG. 20B (FIG. 20B) is a similar view to FIG. 20A, but another workpiece defining a second thickness operably engages with the first bearing and a second bearing of the table saw jig.
Figure 21:
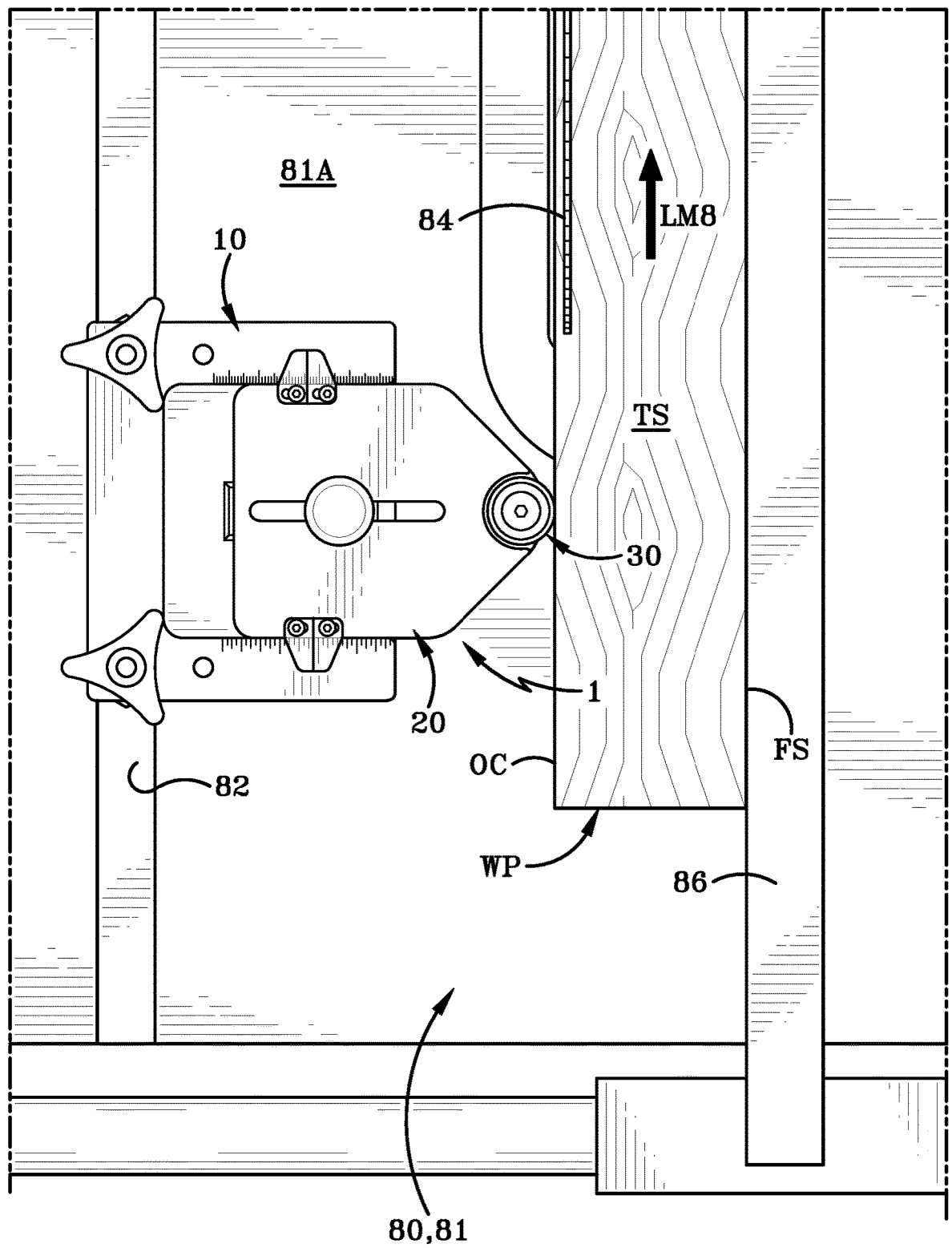
FIG. 21 (FIG. 21) is another operational view similar to FIG. 19, but the workpiece is linearly moved through the cutting blade and collectively guided by the fence stop and the table saw jig.

As described previously, one or both of the upper bearing 33 and the lower bearing 35 may engage a workpiece depending on the thickness of the workpiece. As illustrated in FIG. 20A, the upper bearing 33 only engages workpiece "WP" that defines a first thickness "T" measured between a top surface "TS1" and a bottom surface "BS1" of the workpiece "WP". In this illustration, the top surface "TS1" is vertically below the lower bearing 35, and an offcut side "OS1" of the first workpiece "WP1" positioned between the top surface "TS1" and the bottom surface "BS1" only contacts the upper bearing 33. As illustrated in FIG. 20B, the upper bearing 33 and the lower bearing 35 engage another workpiece "WP'" that defines a second thickness "T'" measured between a top surface "TS'" and a bottom surface "BS'" of the workpiece "WP'"; the second thickness "T'" is greater than the first thickness "T". In this illustration, the top surface "TS'" is vertically above the lower bearing 35, and an offcut side "OS" of the workpiece "WP'" positioned between the top surface "TS'" and the bottom surface "BS'" contacts the upper bearing 33 and the lower bearing 35.

Such inclusion of both the upper bearing 33 and the lower bearing 35 enables a woodworker to introduce varying thicknesses of workpiece to the table saw jig 1 for guiding purposes. As described above, the upper bearing 33 enables a woodworker to introduce a workpiece defining a relatively thin thickness for thin-ripping projects. As also described above, the combination of the upper bearing 33 and the lower bearing 35 enables a woodworker to introduce a workpiece defining a relative larger thickness for thin-ripping projects. As such, the table saw jig 1 enables a woodworker to cut various thicknesses of workpiece while preventing the workpiece from being snagged or jammed against a portion of the table saw jig 1 when being guided along the table saw jig 1. Stated differently, the inclusion of the upper bearing 33 and the lower bearing 35 may prevent an outer edge or end of a workpiece from being snagged or jammed against a portion of the base 10 and the slider 20 when being guide along the table saw jig 1.

Figure 22A:
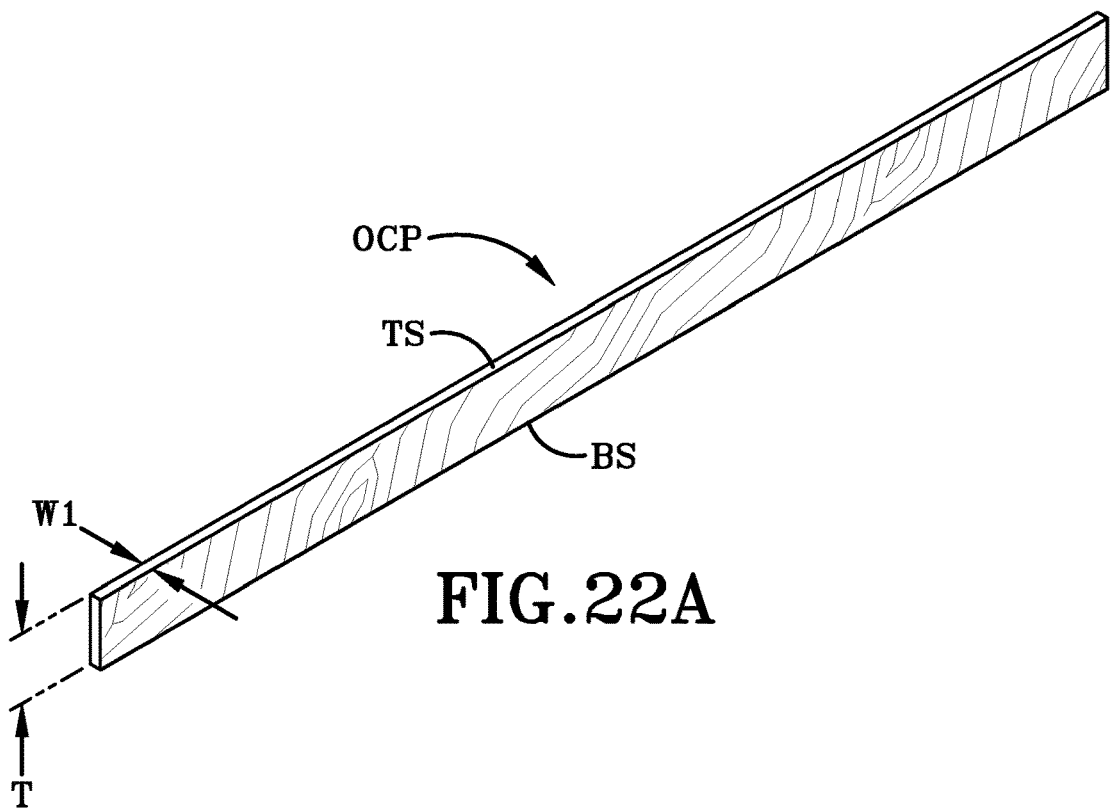
FIG. 22A (FIG. 22A) is an offcut piece of the workpiece cut by the cutting blade of the table saw in FIG. 20A.
Figure 22B:
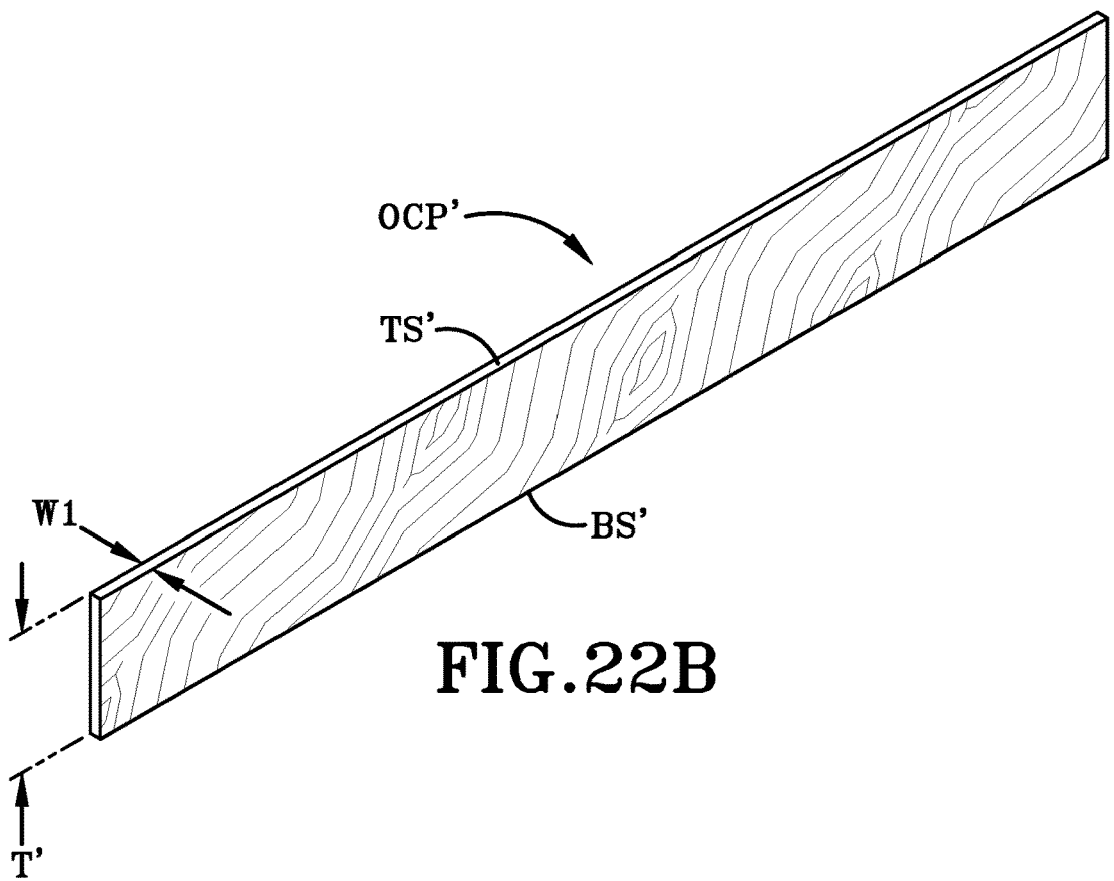
FIG. 22B (FIG. 22B) is an offcut piece of the workpiece cut by the cutting blade of the table saw in FIG. 20B.

Referring to FIG. 22A and FIG. 22B, the table saw jig 1 provides an accurate cut for an offcut piece "OCP" of the workpiece "WP" illustrated in FIG. 20A and another offcut piece "OCP'" of the workpiece "WP'" illustrated in FIG. 20B. Each offcut piece "OCP", "OCP'" also defines a width "W1" that matches with the distances "L1", "L2" set by the operator. Based on the structural configuration of the table saw jig 1, the table saw jig 1 is configured to cut a range of offcut pieces from a workpiece. In one exemplary embodiment, the table saw jig 1 is configured to cut from about 1/32" off of a workpiece up to about one and one-quarter inches off of workpiece.

Figure 23:
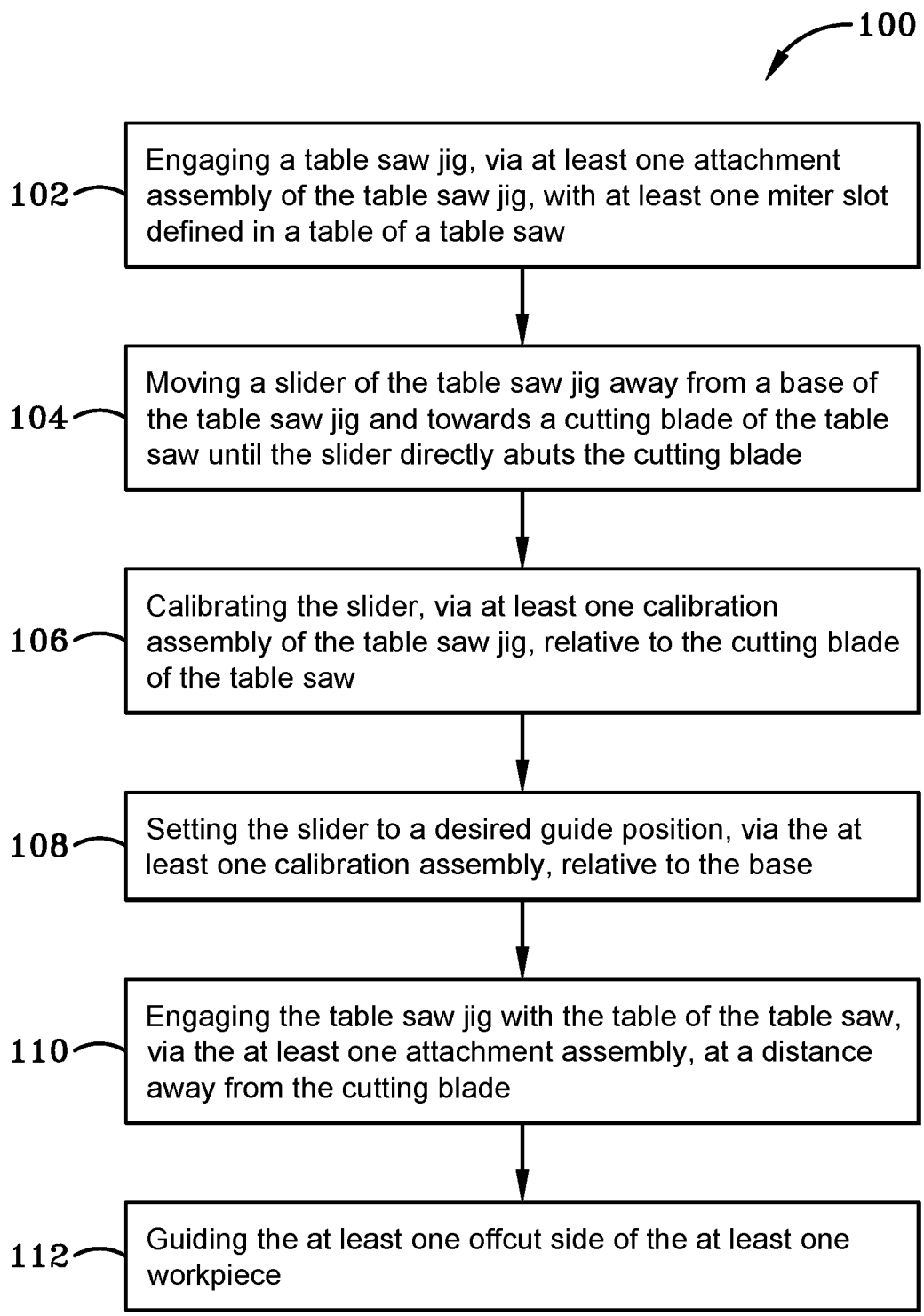
FIG. 23 (FIG. 23) is an exemplary method flowchart of guiding at least one offcut side of at least one workpiece.

FIG. 23 illustrates a method 100 of guiding at least one offcut side of at least one workpiece. An initial step 102 of method 100 includes engaging a table saw jig, via at least one attachment assembly of the table saw jig, with at least one slot defined in a table of a table saw. Another step 104 of method 100 includes moving a slider of a table saw jig towards a blade of the table saw until the slider directly abuts the blade. Another step 106 of method 100 includes calibrating the slider, via a calibration assembly of the table saw jig, relative to the blade of the table saw. Another step 108 of method 100 includes setting the slider to a desired guide position, via the calibration assembly, relative to the base. Another step 108 of method 100 includes engaging the table saw jig with the table of the table saw, via the at least one attachment assembly, at a distance away from the blade. Another step 110 of method 100 includes guiding the at least one offcut side of the at least one workpiece.

In other exemplary embodiments, additional and/or optional steps may be included with method 100 of guiding at least one offcut side of at least one workpiece. An optional step may include calibrating at least one indicator of the at least one calibration assembly with at least one whole measurement marking of at least one set of measurement markings of the at least one calibration assembly. An optional step may include engaging a lower bearing of a bearing assembly of the table saw jig with the at least one offcut side of the at least one workpiece defining a first thickness. An optional step may include engaging the lower bearing of the bearing assembly and an upper bearing of the bearing assembly with at least another offcut side of at least another workpiece defining a second thickness greater than the first thickness. Optional steps may include engaging the at least one attachment assembly with the base via a first opening from a first pattern of openings defined in the base; engaging at least another attachment assembly with the base via a second opening from the first pattern of openings defined in the base; and engaging the base with the table of the table saw, via one or both of the at least one attachment assembly and the at least another attachment assembly, when the table defines a first slot configuration. Optional steps may include engaging the at least one attachment assembly with the base via a first opening from a second pattern of openings defined in the base; engaging the at least another attachment assembly with the base via a second opening from the second pattern of openings defined in the base; and engaging the base with the table of the table saw, via one or both of the at least one attachment assembly and the at least another attachment assembly, when the table defines a second slot configuration different than the first slot configuration.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A table saw jig, comprising:
    a base having an open first end, a closed second end longitudinally opposite to the open first end, and a cavity defined between the open first end and the closed second end;
    a slider moveably engaged inside of the cavity of the base and having an engagement end extending through the open first end that is adapted to guide an offcut side of at least one workpiece along a table of a table saw and a stop end longitudinally opposite to the engagement end and configured to engage with the closed second end inside of the cavity;
    at least one attachment assembly operably engaged with the base, the at least one attachment assembly having at least a connector, a slot nut operably engaged with the connector and adapted to engage the base with the table of the table saw, and a handle threadably engaged with the connector to releasably engage the base with the table; and
    at least one calibration assembly having an indicator operably engaged with the slider and a set of measurement markings provided on the base; wherein the at least one calibration assembly is configured to calibrate the slider relative to a blade of the table saw when the base is operably engaged with the table of the table saw; and
    a locking knob operably engaged with the base and the slider to enable linear movement of the slider relative to the base to move the slider inwardly and outwardly of the cavity; wherein when the locking knob is engaged with the base and disengaged with the slider, the slider is freely moveable inside of the cavity; and wherein when the locking knob is engaged with the base and engaged with the slider, the slider is prevented from being freely moveable inside of the base.

2. The table saw jig of claim 1, wherein the at least one indicator is selectively moveable on the slider to substantially align at least one cursor of the indicator with at least one measurement marking of the set of measurement markings to calibrate the table saw jig with the blade of the table saw.

3. The table saw jig of claim 2, further comprising:
    at least another calibration assembly operably engaged with the slider and the base;
    wherein the at least another calibration assembly further comprises:
    at least another indicator having at least another cursor and operably engaged with the slider; and
    at least another set of measurement markings provided on the base differing from the at least one set of measurement markings;
    wherein the at least another indicator is selectively moveable on the slider to substantially align the at least another cursor with at least one measurement marking of the at least another set of measurement markings to calibrate the table saw jig with the blade of the table saw.

4. The table saw jig of claim 3, wherein the at least one indicator and the at least another indicator are separate and independent from one another.

5. The table saw jig of claim 1, wherein the slider comprises:
    a bearing assembly operably engaged with the slider at a position remote from the base;
    wherein the bearing assembly is adapted to guide the offcut side of the at least one workpiece along the table of the table saw.

6. The table saw jig of claim 5, wherein the bearing assembly comprises:
    a shaft operably engaged with the slider and having a top end and a bottom end vertically opposite to the top end;
    an upper bearing operably engaged at the top end of the shaft; and a lower bearing operably engaged at the bottom end of the shaft;

wherein the lower bearing is configured to guide the offcut side of the at least one workpiece defining a first thickness along the table of the table saw; and wherein the upper bearing and the lower bearing are collectively configured to guide at least another offcut side of at least another workpiece defining a second thickness that is greater than the first thickness along the table of the table saw.

7. The table saw jig of claim 6, wherein the slider further comprises:

a first recess defined in the slider extending downwardly from a top surface of the slider towards a dividing wall of the slider; and a second recess defined in the slider extending upwardly from a bottom surface of the slider towards the dividing wall of the slider;

wherein the first recess and the dividing wall are configured to receive and house the upper bearing partially inside of the slider;

wherein the second recess and the dividing wall are configured to receive and house the lower bearing partially inside of the slider.

8. The table saw jig of claim 6, further comprising:

a rail extending upwardly from the base inside of the cavity; and a channel extending upwardly into the slider from a bottom surface of the slider towards a top surface of the slider and is positioned vertically above the rail;

wherein the engagement between the rail and the channel centrally aligns the slider with the base.

9. The table saw jig of claim 1, wherein the base comprises:

at least one pattern of openings extending entirely through the base between a top surface of the base and a bottom surface of the base;

wherein the at least one pattern of openings is configured to receive the at least one attachment assembly for operably engaging the at least one attachment assembly with the base.

10. The table saw jig of claim 9, wherein the at least one pattern of openings comprises:

a first pattern of openings extending entirely through the base between the top surface of the base and the bottom surface of the base and located at a first distance from an end of the base; and a second pattern of openings extending entirely through the base between the top surface of the base and the bottom surface of the base and located at a second distance from the end of the base;

wherein the second distance is greater than the first distance.

11. The table saw jig of claim 1, wherein the slider further comprises:

a top end;

a bottom end opposite to the top end; and a central slot defined between the top end and the bottom end such that the top end and the bottom end are in communication with one another;

wherein the central slot is configured to house a portion of the locking knob for the locking knob to engage with the slider and the base, collectively.

12. A method of guiding at least one offcut side of at least one workpiece, comprising steps of:

engaging a table saw jig, via at least one attachment assembly of the table saw jig, with at least one miter slot defined in a table of a table saw; the at least one attachment assembly having at least a connector, a slot nut operably engaged with the connector and adapted to removably engage a base with the table of the table saw, and a handle threadably engaged with the connector to releasably engage the base with the table;

moving an engagement end of a slider of the table saw jig away from a closed stop end of the base of the table saw jig and away from a cavity defined in the base, through an open first end of the base longitudinally opposite from the closed stop end, and towards a cutting blade of the table saw until the slider directly abuts the cutting blade, wherein a locking knob is engaged with the base and disengaged with the slider, the slider is freely moveable inside of the cavity;

calibrating the slider, via at least one calibration assembly of the table saw jig, relative to the cutting blade of the table saw; the at least one calibration assembly having at least one indicator operably engaged with the slider and at least one set of measurement markings provided on a top end of the base remote from the cavity;

setting the slider to a desired guide position, via the at least one calibration assembly, relative to the base;

locking the slider to the desired guide position by the locking knob, wherein the locking knob is engaged with the base and engaged with the slider;

engaging the table saw jig with the table of the table saw, via the at least one attachment assembly, at a distance away from the cutting blade; and guiding the at least one offcut side of the at least one workpiece.

13. The method of claim 12, further comprising:

calibrating the at least one indicator of the at least one calibration assembly with the at least one whole measurement marking of at least one set of measurement markings of the at least one calibration assembly.

14. The method of claim 12, further comprising:

engaging a lower bearing of a bearing assembly of the table saw jig with the at least one offcut side of the at least one workpiece defining a first thickness.

15. The method of claim 14, further comprising:

engaging the lower bearing of the bearing assembly and an upper bearing of the bearing assembly with at least another offcut side of at least another workpiece defining a second thickness greater than the first thickness.

16. The method of claim 12, further comprising:

engaging the at least one attachment assembly with the base via a first opening from a first pattern of openings defined in the base;

engaging at least another attachment assembly with the base via a second opening from the first pattern of openings defined in the base; and engaging the base with the table of the table saw, via one or both of the at least one attachment assembly and the at least another attachment assembly.

17. The method of claim 16, further comprising:

removing the at least one attachment assembly and the at least one another attachment assembly from the base at the first pattern of openings;

engaging the at least one attachment assembly with the base via a first opening from a second pattern of openings defined in the base;

engaging the at least another attachment assembly with the base via a second opening from the second pattern of openings defined in the base; and engaging the base with the table of the table saw, via one or both of the at least one attachment assembly and the at least another attachment assembly.

\* \* \* \* \*